(12) United States Patent
Abe et al.

(10) Patent No.: US 7,526,082 B2
(45) Date of Patent: Apr. 28, 2009

(54) PORTABLE TERMINAL AND OPENING OR CLOSING METHOD THEREFOR

(75) Inventors: Kenji Abe, Yokohama (JP); Tomoaki Nakamura, Machida (JP); Tsutomu Zaima, Kitami (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 707 days.

(21) Appl. No.: 10/800,165

(22) Filed: Mar. 10, 2004

(65) Prior Publication Data

US 2004/0202316 A1  Oct. 14, 2004

(30) Foreign Application Priority Data

Mar. 10, 2003 (JP) .............................. 2003-064250
Apr. 17, 2003 (JP) .............................. 2003-113435

(51) Int. Cl.
*H04M 1/00* (2006.01)
*H04M 9/00* (2006.01)

(52) U.S. Cl. ........................ 379/433.11; 379/433.13; 455/575.3

(58) Field of Classification Search ............ 379/428.01, 379/433.01, 433.02, 433.04, 433.06, 433.07, 379/433.11–433.13; 455/90.3, 575.1, 575.3, 455/575.4
See application file for complete search history.

(56) References Cited

U.S. PATENT DOCUMENTS

2002/0061770 A1  5/2002  Ozaki

FOREIGN PATENT DOCUMENTS

| CN | 1354587 A | 6/2002 |
|----|-----------|--------|
| JP | 05-211547 | 8/1993 |
| JP | 7-16218 | 3/1995 |
| JP | 07-272468 | 10/1995 |
| JP | 2001-292209 | 10/2001 |
| JP | 2002-064609 | 2/2002 |
| JP | 2002-135380 | 5/2002 |
| JP | 2002171189 | 6/2002 |

OTHER PUBLICATIONS

English translation of the Chinese Office Action dated Oct. 24, 2008.
Japanese Notice of Ground for Rejection with English translation.
An English translation of the relevant parts of cited references.
Japanese Notice of Final Rejection with English translation dated Oct. 30, 2007.

*Primary Examiner*—Tuan D Nguyen
(74) *Attorney, Agent, or Firm*—Schulte Roth & Zabel LLP; John C. Garces

(57) ABSTRACT

A portable terminal has one casing with a display unit and a speaker coupled to another casing with an operation unit and a microphone. The casings connect via a coupling unit and are capable of opening or closing by means of the coupling unit. The face of the casing with the speaker is directed in the same direction as the face of the casing with the microphone. The coupling unit enables one casing to be inclined to the other casing and to rotate around an axis substantially perpendicular to the face of the other casing with a microphone. Opening the casings increases the sound collecting rate of the microphone during a phone call and prevents a top face of the operation unit from being rubbed or scratched by the other.

24 Claims, 22 Drawing Sheets

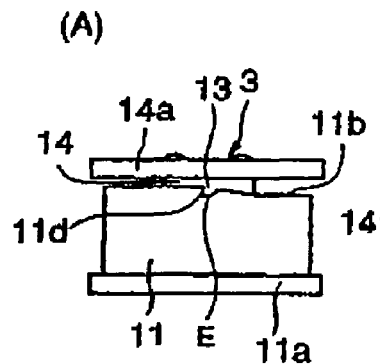
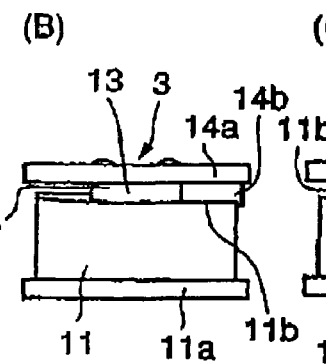
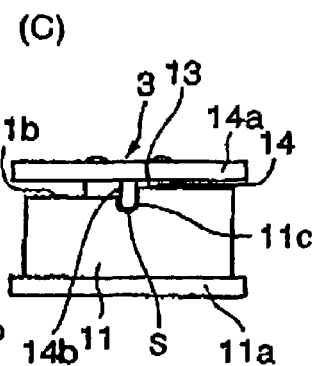
FIG.2(A) FIG.2(B) FIG.2(C)
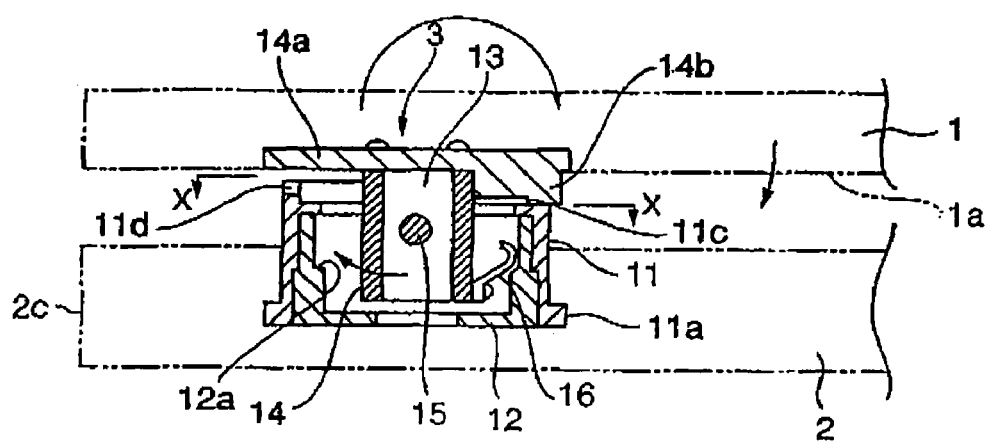
FIG.3

0°

180°

0°

180°

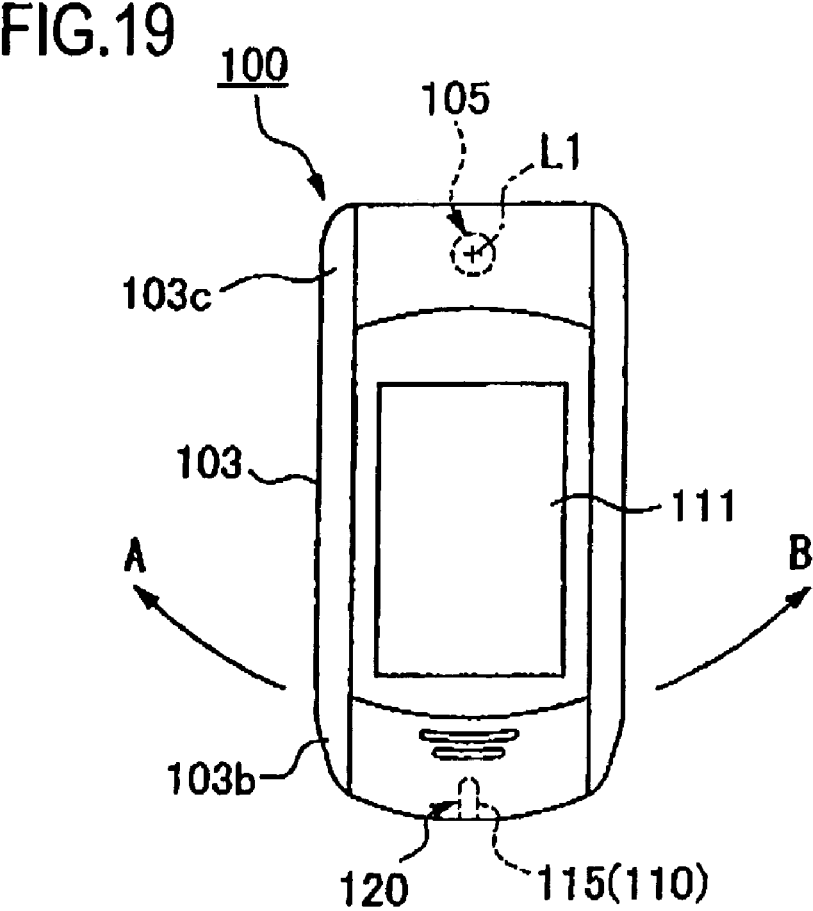

FIG.26(A) *PRIOR ART*
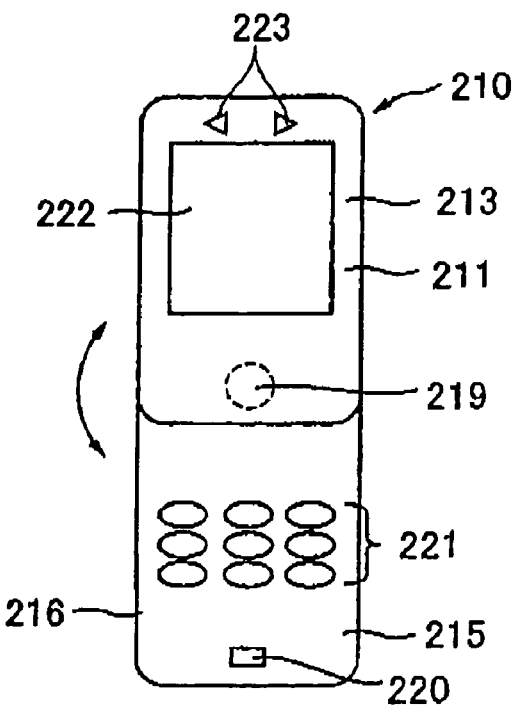
FIG.26(B)
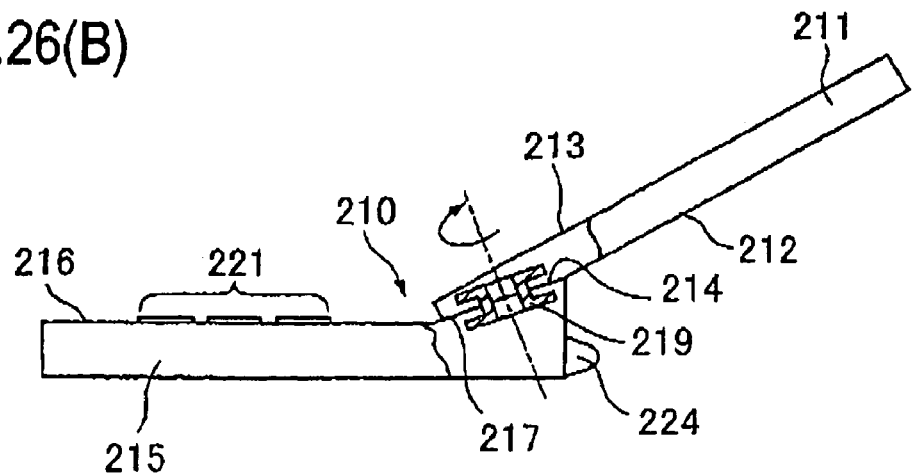

PORTABLE TERMINAL AND OPENING OR CLOSING METHOD THEREFOR

BACKGROUND OF THE INVENTION

1. Field of the Invention

The present invention relates to a portable terminal such as a personal digital cellular (PDC), a personal handy-phone system (PHS), a code division multiple access (CDMA), a global system for mobile communication (GSM), a personal digital assistants (PDA) having a datebook size, or a portable personal computer. More particularly, the present invention relates to a portable terminal in which one casing is coupled to another casing via a rotating mechanism at their ends.

2. Description of the Related Art

Various portable terminals are currently manufactured, such as a PDC, a PHS, a CDMA, a GSM, a wide band CDMA (WCDMA) under development as a next-generation technology, a portable phone with CDMA2000 or other communication means, a PDA having a datebook size, or a portable personal computer. These types of portable terminals, having a foldable mechanism superposing one casing on the other casing for increased portability, have become popular. Among them, for example, there has been suggested a portable terminal wherein one casing having a display unit is connected to the other casing having an operation unit via a coupling unit and wherein the casings may be opened or closed with the face having the display unit of one casing directed in the same direction as the face having the operation unit of the other casing.

For example, in Japanese Unexamined Patent Publication (Kokai) No. Hei7-288860 (1995), as shown in FIG. 25(A) and 25(B), there has been disclosed a portable terminal 200, comprising one casing 201 having a display unit 207 and a speaker 208 coupled to the second casing 203 having an operation unit 206 and a microphone 205 via a hinge axis unit 204, wherein one casing 201 is rotated horizontally to a face 203a having the operation unit 206 and the microphone 205 of the second casing 203 in a condition that a face 202 having the display unit 207 and the speaker 208 of one casing 201 is directed in the same direction as for the face 203a having the operation unit 206 and the speaker 205 of the second casing 203. An antenna 209 is disposed so as to be retractable at an end of one casing 201.

Also, in Japanese Unexamined Patent Publication (Kokai) No. 2002-158758, as shown in FIG. 26(A) and 26(B), there has been disclosed a portable terminal 210, comprising one casing 211 having a display unit 222 and a speaker 223 and the other casing 215 having an operation unit 221 and a microphone 220. There is provided an inclined face 217 protruding from a face 216 having the operation unit 221 and the microphone 220 of the second casing 215 when the first casing 211 and the second casing 215 are oppositely disposed so that a face 213 having the display unit 222 and the speaker 223 of the first casing 211 is directed in the same direction as for the face 216 having the operation unit 221 and the microphone 220 of the second casing 215. There is also provided an inclined face 214 notched so as to correspond to the inclined face 217 on an opposite face 212 to the face 213 having the display unit 222 and the speaker 223 of the first casing 211. The inclined face 214 is coupled to the inclined face 217 via a rotating shaft 219, and the first casing 211 is rotated relative to the second casing 215 around the rotating shaft 219. An antenna 224 is disposed at an end of the second casing 215.

Both the portable terminals 100 and 210 shown in FIGS. 25(A) and 25(B) and FIGS. 26(A) and 26(B) are capable of displaying information on the display units 207 and 222 when they are closed as shown in FIG. 25(B) and not just when they are opened as shown in FIG. 25(A) and FIG. 26(A), respectively.

The portable terminal 200 shown in FIGS. 25(A) and 25(B), however, is such that the casing 201 rotates parallel to the face 203a having the operation unit 206 and the microphone 205 of the second casing 203. Therefore, the first casing 201 slides on the operation unit 206 of the second casing 203 and keystop symbols on the top face of the operation unit 206 are thereby rubbed by the first casing 201. The keystop symbols may therefore become unreadable and the face opposed to the speaker 208 of the first casing 201 may also be damaged by a flaw or dirt.

Furthermore, due to the first casing 201 rotating parallel to the face 203a having the operation unit 206 and the microphone 205 of the second casing 203, the face 203a having the operation unit 206 and the microphone 205 of the second casing 203 is disposed in parallel to the face 202 having the display unit 207 and the speaker 208 of the first casing 201 when this casing 201 is opened relative to the second casing 203. The face 203a is disposed at the rear of the face 202 having the display unit 207 and the speaker 208 of the first casing 201. Thus the terminal is incapable of bringing the microphone 205 of the second casing 203 close to a user's mouth when the user bends his or her ear to the speaker 208 of the first casing 201 during a phone call, thereby causing a problem of a low sound collecting rate, by which the user cannot transmit clear speech sounds to the other party.

In addition, the portable terminal 210 shown in FIGS. 26(A) and 26(B) also is such that the first casing 211 rotates horizontally to the face 216 having the operation unit 221 and the microphone 220 of the second casing 215 at an initial stage of the rotation. Therefore, the first casing 211 slides on the operation unit 221 of the second casing 215 and thereby keystop symbols on the top face of the operation unit 221 may be rubbed by the first casing 211, making the symbols unreadable and may damage the opposite face to the speaker 223 of the first casing 211 with a flaw or dirt.

SUMMARY

A portable terminal is described below to address the need for preventing surfaces coming into contact when rotating open the portable terminal. One aspect of the invention is a portable terminal having a first casing and a second casing The casings have respective first and second surfaces facing a user of the portable terminal. The portable terminal includes a rotating mechanism coupling the first casing to the second casing and inclining the first casing relative to the second casing during at least an initial stage of rotating the first casing relative to the second casing. The surfaces substantially face the user when rotating the first casing relative to the second casing.

Another aspect of the invention is an opening or closing method for use in a portable terminal having a rotating mechanism for coupling ends of a first casing and a second casing superposed on each other, and for opening or closing the portable terminal by rotating the first casing relative to the second casing with surfaces of the same side in the first casing and the second casing directed substantially in the same direction. The first casing is relatively spaced away from the second casing at least in an initial stage of the rotation of the first casing.

The forgoing and other features and advantages of preferred embodiments will be more readily apparent from the following detailed description, which proceeds with reference to the accompanying drawings.

BRIEF DESCRIPTION OF THE DRAWINGS

FIG. 1 is a diagram showing a portable phone as an example of a portable terminal of the present invention.

FIG. 2 is a diagram showing a preferred embodiment of a coupling unit arranged in the portable terminal of FIG. 1. FIG. 2(A) is a rear view, FIG. 2(B) is a side view, and FIG. 2(C) is a front view;

FIG. 3 is a cross section showing the coupling unit of the preferred embodiment arranged in the portable terminal of FIG. 2;

FIG. 10 is an exploded view of an embodiment of the rotating mechanism in the portable terminal of FIG. 8.

FIG. 11 is a cross section of an embodiment of the rotating mechanism in the preferred embodiment of the portable terminal of FIG. 8.

FIG. 19 is a schematic plan view showing a closed configuration of the first and second casings in the portable phone in FIG. 18;

FIG. 20 is a diagram showing the closed configuration of the first and second casings in the portable phone in FIG. 18.

FIG. 25 is a diagram showing an example of a conventional portable terminal: FIG. 26 is a diagram showing another example of a conventional portable terminal: FIG. 26(A) is a plan view showing its opened configuration and FIG. 26(B) is a partially broken schematic side view showing its opened configuration.

DETAILED DESCRIPTION OF THE PREFERRED EMBODIMENTS

The preferred embodiments of the present invention will now be described in detail for purposes of illustration hereinafter with reference to the accompanying drawings. It should be noted, however, that the sizes, materials, shapes, relative arrangements, and the like of the components described in the embodiments are not intended to limit the scope of the present invention to only those described, unless otherwise specified, and they are simply illustrative examples.

Figure 1A:
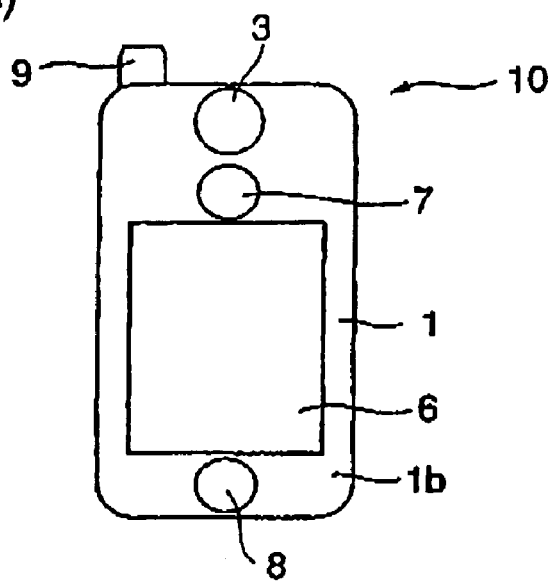
FIG. 1(A) is a plan view showing its closed condition and FIG. 1(B) is a plan view showing its opened condition.
Figure 1B:
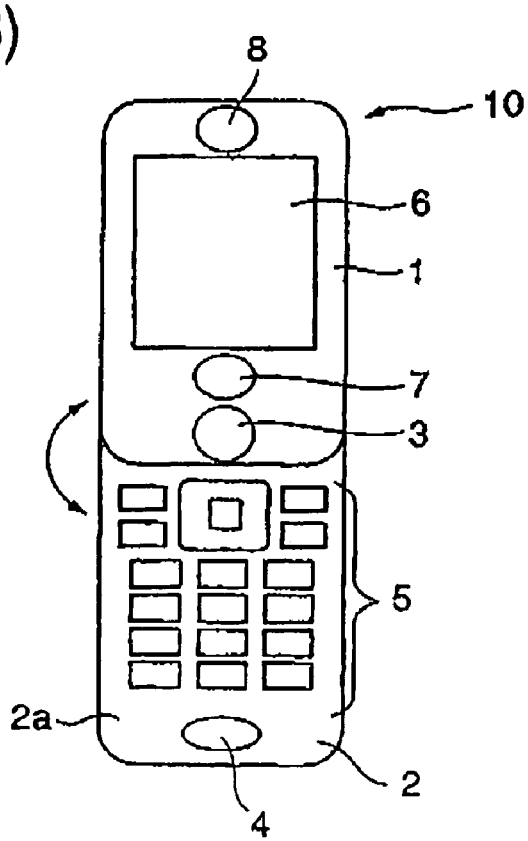
Figure 4:
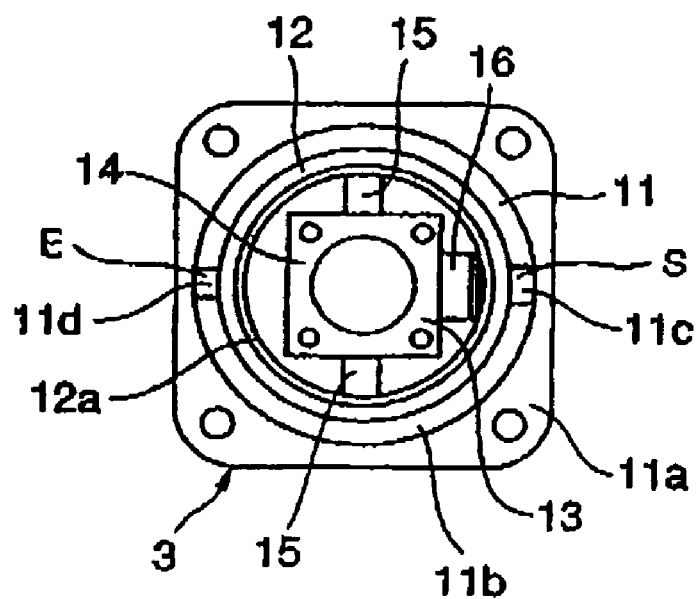
FIG. 4 is a cross-sectional view taken on line X-X of FIG. 3.

Referring to FIG. 1, there is shown a diagram of a portable phone as an example of a portable terminal according to a preferred embodiment of the present invention: FIG. 1(A) is a plan view showing its closed configuration and FIG. 1(B) is a plan view showing its opened configuration. Referring to FIG. 2, there is shown a diagram of a preferred embodiment of a coupling unit or rotating mechanism arranged in the portable terminal of the present invention: FIG. 2(A) is a rear view, FIG. 2(B) is a side view, and FIG. 2(C) is a front view. Referring to FIG. 3, there is shown a cross section of the coupling unit of the preferred embodiment of FIG. 2 arranged in the portable terminal. Referring to FIG. 4, there is shown a cross-sectional view taken on line X-X of FIG. 3. Referring to FIG. 5, there is shown a perspective view of an opened or closed configuration in the preferred embodiment of the portable terminal. Referring to FIG. 6, there is shown a side view of an opened or closed configuration in the preferred embodiment of the portable terminal of FIG. 2. Referring to FIG. 7, there is shown a cross section of an opened or closed configuration of the coupling unit in the preferred embodiment of the portable terminal of FIG. 2.

In these diagrams, the same reference numerals have been retained for the same parts, namely, a casing 1 having a display unit 6, the second casing 2 having an operation unit 5, a coupling unit or rotating mechanism 3 for connecting the first casing 1 to the second casing 2, a microphone 4, an operation unit 5, a display unit 6, speakers 7 and 8, an antenna 9, a portable terminal 10, a base member 11, a flange 11*a*, a guide way (guide unit) 11*b*, a depression 11*c* on the side of a starting point, a depression 11*d* on the side of an end point, a rotator 12, an internal surface 12*a*, a joint 13, a cylindrical body 14, a locking plate 14*a*, a protrusion 14*b*, a rotating shaft 15, and an elastic body 16. The cylindrical body 14, the locking plate 14*a*, and the protrusion 14*b* form a second base member.

The portable terminal 10 according to the present invention comprises the first casing 1 and the second casing 2 oppositely disposed and the coupling unit 3 for connecting the casings 1 and 2 to each other rotatably as shown in FIG. 1 illustrating a portable phone as an example of the portable terminal, wherein the casings 1 and 2 are relatively rotatable around an axis substantially perpendicular to an opposed face 2*a* by means of the coupling unit 3.

The second casing 2 has functions of the operation unit 5 and the microphone 4 on the side of the face 2*a* opposed to the first casing 1, and the microphone 4 is disposed at an end of the opposite side to the coupling unit 3. On the side of an outer surface 1*b*, which is on the opposite side to the second casing 2, the portable phone has the display unit 6 such as a liquid crystal display and a facility made of two speakers 7 and 8 disposed on both sides of the display unit 6, with one speaker 7 disposed in the vicinity of the coupling unit 3 and the other speaker 8 disposed at an end of the opposite side to the coupling unit 3. Accordingly, the outer surface 1*b* having the speakers 7 and 8 of the first casing 1 is directed in the same direction during rotation as the opposed face 2*a* having the microphone 4 of the second casing 2. The second casing 2 accommodates the antenna 9 retractably and it is retractable from the end face in the vicinity of the coupling unit 3.

The following describes a detailed structure of a preferred embodiment of the coupling unit 3 arranged in the portable terminal of the present invention with reference to FIGS. 2 to 4.

The coupling unit 3 comprises a first base member 11 substantially cylindrical and having an axis perpendicular to the opposed face (provided with functions) 2*a* with the microphone 4 of the second casing 2; the rotator 12 substantially cylindrical and rotatably joined to the inside of the first base member 11; and the joint 13 coupling the rotator 12 to the first casing 1 and having an inclining mechanism enabling the first casing 1 to incline to the rotator 12.

The joint 13 comprises the cylindrical body 14 disposed in the rotator 12; the rotating shaft 15 disposed penetrating the cylindrical body 14 and perpendicularly with respect to the axis of the cylindrical body 14; and the locking plate 14*a* arranged at an end of the cylindrical body 14. The joint 13 puts the locking plate 14*a* provided in the cylindrical body 14 together with the opposed face 1*a* and fixes both ends of the rotating shaft 15 to the rotator 12 so as to couple the first casing 1 to the rotator 12. In this configuration, the rotating shaft 15 is disposed so as to be perpendicular to the axis of the rotator 12 and to be in parallel to an end face 2*c* of the second casing 2. The rotating shaft 15, the cylindrical body 14, and the rotator 12 form the inclining mechanism enabling the first casing 1 to incline relative to the second casing 2.

Figure 5A:
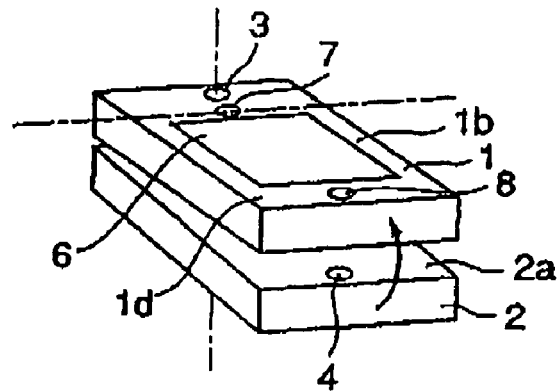
FIGS. 5(A) to 5(C) are perspective views each showing an opened or closed configuration in the preferred embodiment of the portable terminal of FIG. 1.
Figure 6A:
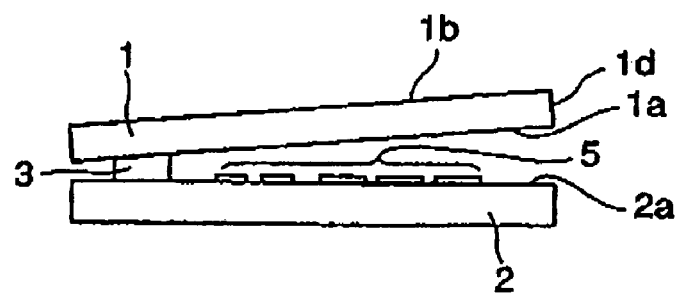
FIGS. 6(A) and 6(B) are side views each showing an opened or closed configuration in the preferred embodiment of the portable terminal of FIG. 1.

In other words, the cylindrical body 14 may be tilted relative to the rotator 12 around the rotating shaft 15. As shown in FIGS. 5(A) and 6(A), the first casing 1 may be inclined relative to the second casing 2 by raising the end opposed to the coupling unit 3 of the first casing 1 from the opposed face 2*a* having the microphone 4 of the second casing 2.

The elastic body 16 is attached to the end on the opposite side to the locking plate 14*a* of the cylindrical body 14. By biasing the elastic body 16 to the internal surface 12*a* of the rotator 12, the end on the opposite side to the coupling unit 3 of the first casing 1 is pressed to the opposed face 2*a* having the microphone 4 of the second casing 2 with an elastic action of the elastic body 16.

Furthermore, there is provided the flange 11*a* at an end of the first base member 11. The flange 11*a* is connected to the opposed face 2*a* of the second casing 2 and a step portion is formed at the top of the other end of the first base member 11 with a lower half area formed by notching. The bottom face of the step portion is used as the guideway 11*b* and the depressions 11*c* and 11*d* are formed at its starting point S and its end point E, respectively. The guideway 11*b* has the same height from the vicinity of the starting point S to the middle of it and has a slightly higher portion in the vicinity of the end point E. The guideway 11*b* may be an inclined face whose height gradually increases from the starting point S to the end point E.

The protrusion 14*b* provided in the locking plate 14*a* forming the second base member is guided slidingly along the guideway 11*b* of the first base member 11. The line between the starting point S and the end point E of the guideway 11*b* is perpendicular to the rotating shaft 15 in the arrangement. The starting point S of the guideway 11*b* is located on the side of the operation unit 5, and the end point E of the guideway 11*b* is located on the side of the end face 2*c* of the second casing 2.

The following describes the opened or closed configuration of the portable terminal 10 shown in FIG. 1. First, in the configuration where the first casing 1 is closed relative to the second casing 2 as shown in FIG. 1(A), the protrusion 14*b* of the second base member is engaged with the depression 11*c* provided on the side of the starting point S of the first base member 11 as shown in FIG. 2(*c*) and FIG. 3, by which the first casing 1 does not rotate around the coupling unit 3 relative to the second casing 2.

As stated above, if the portable terminal 10 is a portable phone and there is an incoming call in the configuration where the first casing 1 is superposed on the second casing 2, receiving information such as a name or a telephone number of a calling party is displayed on the display unit 6. Then, the microphone 4 and the speaker 7 far from the microphone 4 (close to the coupling unit 3) are activated, and the speaker 8 close to the microphone 4 (at the end on the opposite side to the coupling unit 3) is deactivated. Thereafter, a user can start a phone call by depressing an off-hook operation unit (not shown) and bringing the speaker 7 close to the user's ear. In this configuration, the portable terminal 10 is put in a folded configuration and therefore it does not have an enough length to bring the microphone 4 close to the users' mouth. By increasing the sensitivity of the microphone 4, however, the transmitted speech sound can be collected.

Figure 7A:
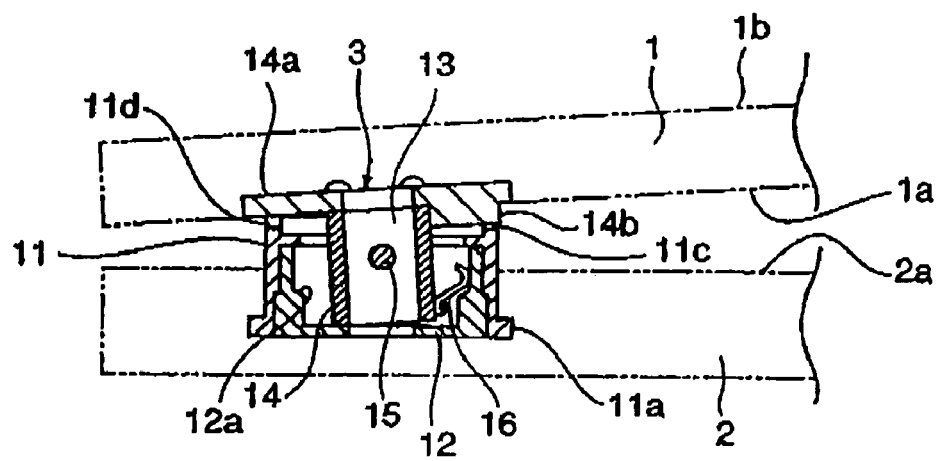
FIGS. 7(A) and 7(B) are cross sections each showing an opened or closed configuration of the coupling unit in the preferred embodiment of FIG. 2.

Subsequently, to open the first casing 1 from the position in which it is closed relative to the second casing 2, an end 1*d* on the opposite side to the coupling unit 3 of the first casing 1 is raised from the opposed face 2*a* having the microphone 4 of the second casing 2 as shown in FIGS. 5(A), 6(A), and 7(A) to tilt the first casing 1 relative to the opposed face 2*a* having the microphone 4 of the second casing 2. In this configuration, the protrusion 14*b* of the second base member gets out of the depression 11*c* existing on the side of the starting point S of the first base member 11.

Figure 5B:
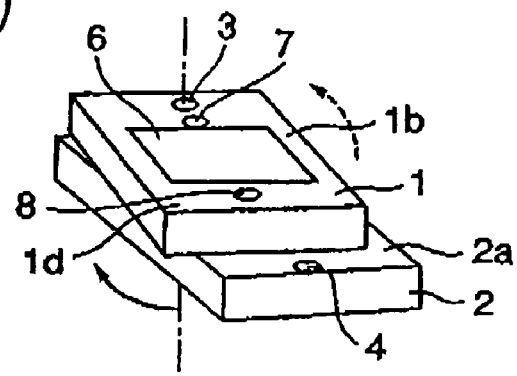

Subsequently, as shown in FIG. 5(B), the first casing 1 is rotated around the axis of the first base member 11. In this configuration, the protrusion 14*b* of the second base member is guided to the end point E while sliding on the guideway 11b, so that the first casing 1 is rotated while inclined relative to the opposed face 2a having the microphone 4 of the second casing 2. Therefore, the operation unit 5 provided on the opposed face 2a of the second casing 2 does not slide on the first casing 1. Thus, it is possible to prevent keytop markings on the top face of the operation unit 5 from being rubbed or scratched by the first casing 1, and to prevent the opposed face 1a of the first casing 1 from accumulating dirt.

In addition, during the rotation of the first casing 1 relative to the second casing 2, the first casing 1 is guided while supported by the first base member 11, and therefore it is possible to prevent wobbling of the first casing 1 during the rotation. Furthermore, since the step is formed on the first base member 11, it is possible to prevent the first casing 1 from rotating in the direction indicated by a dotted line in FIG. 5(B): for example, it is possible to prevent a lead wire (not shown) passed through the rotator 14 forming the coupling unit 3 from entwining itself.

Figure 5C:
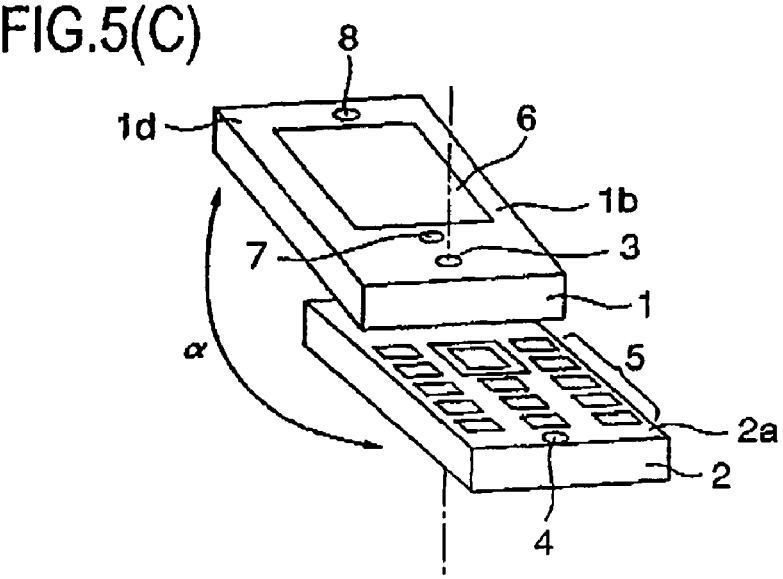
Figure 6B:
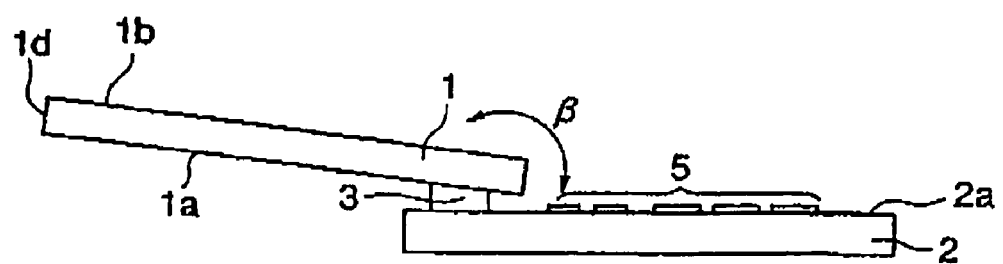
Figure 7B:
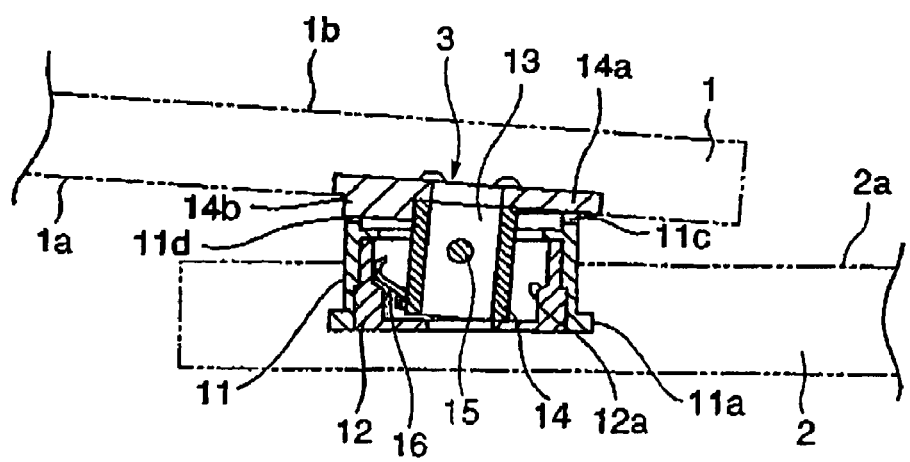

As shown in FIGS. 5(C), 6(B), and 7(B), the first casing 1 is rotated substantially 180 degrees and the protrusion 14b of the second base member is engaged with the depression 11d provided at the end point E of the guideway 11b, by which the rotation completes. Thus, the first casing 1 may be opened inclined relative to the second casing 2. In the opened configuration, it is preferable that an angle β formed between the outer surface 1b having the speakers 7 and 8 of the first casing 1 and the opposed face 2a having the microphone 4 of the second casing 2 is within a range greater than 90 degrees and smaller than 180 degrees, more preferably, within a range greater than 150 degrees and smaller than 180 degrees.

If a call is received in the opened configuration, receiving information such as a name or a telephone number of a calling party is displayed on the display unit 6. Then, the microphone 4 and the speaker 8 far from the microphone 4 (at the end on the opposite side to the coupling unit 3) are activated, and the speaker 7 close to the microphone 4 (close to the coupling unit 3) is deactivated. Thereafter, by depressing an off-hook button (not shown) and bringing the speaker 8 close to the user's ear, the microphone 4 of the second casing 2 can be brought close to the user's mouth. Thereby, it is possible to increase the sound collecting rate and thus to transmit a clear speech sound to the other party.

Figure 8A:
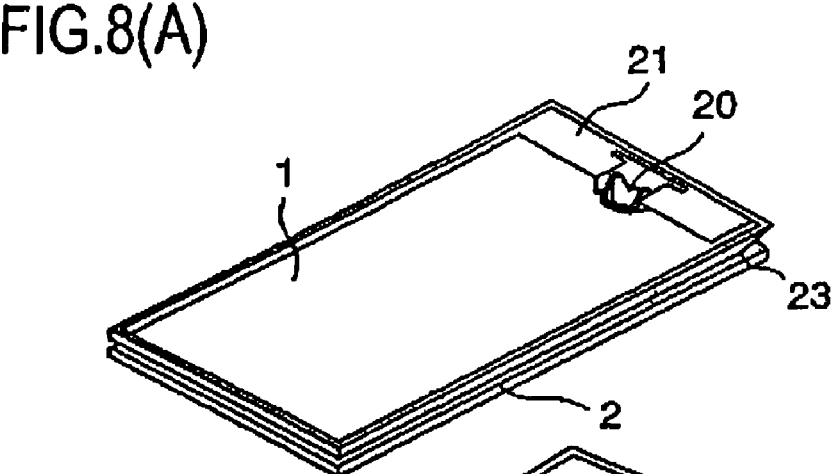
FIGS. 8(A) to 8(D) are perspective views for explaining the method of opening or closing the first casing and the second casing in another preferred embodiment of the portable terminal.
Figure 8B:
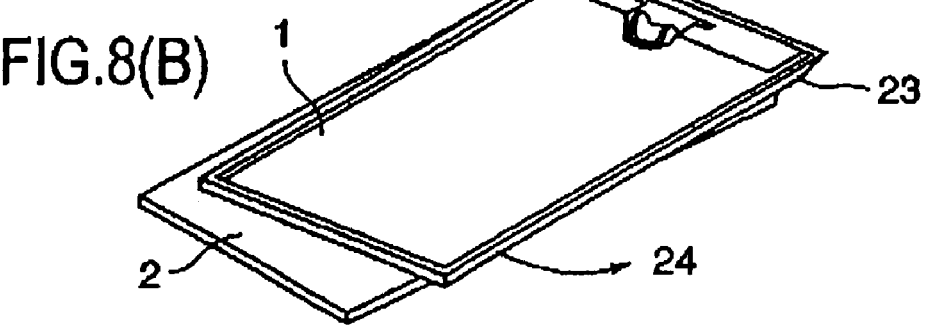
Figure 8C:
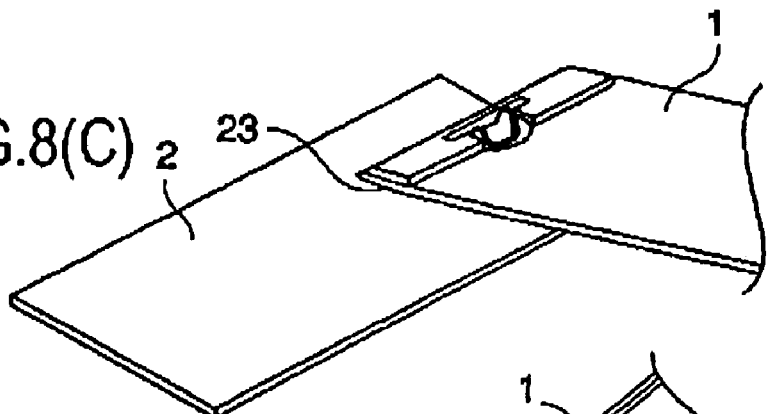
Figure 8D:
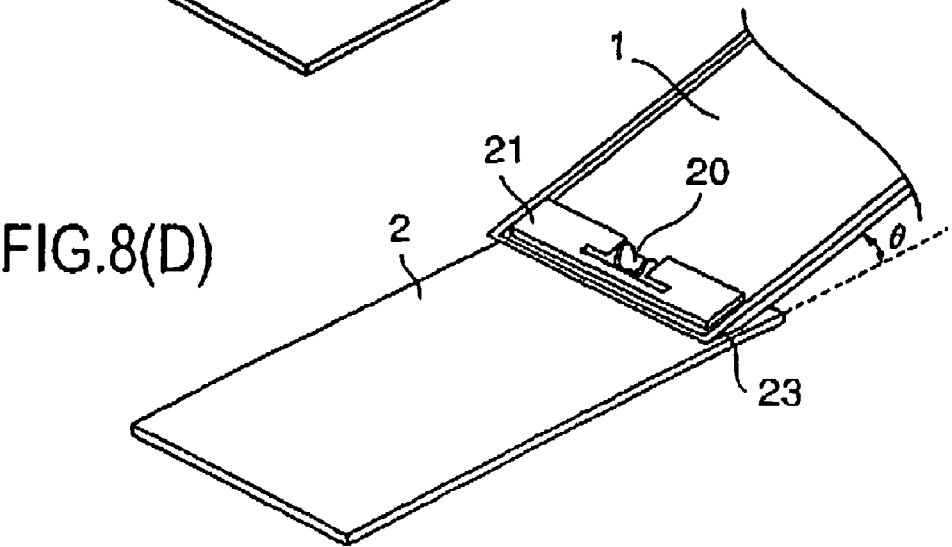
Figure 9:
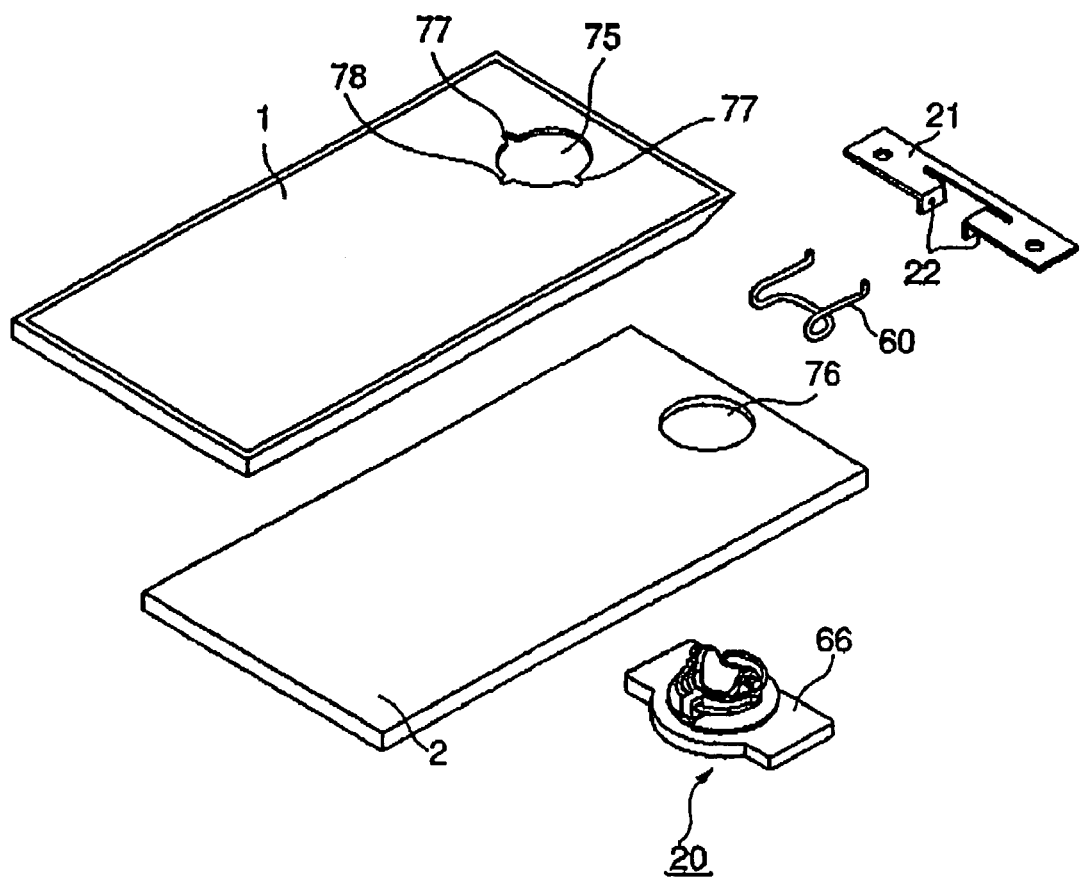
FIG. 9 is a configuration diagram for a rotating mechanism in the preferred embodiment of the portable terminal of FIG. 8.
Figure 10A:
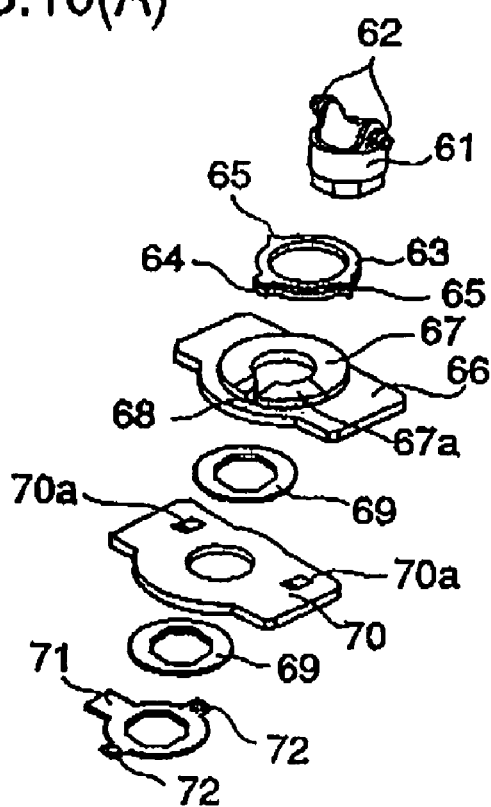
FIG. 10(A) is a view as seen from the above and FIG. 10(B) is a view as seen from below.
Figure 10B:
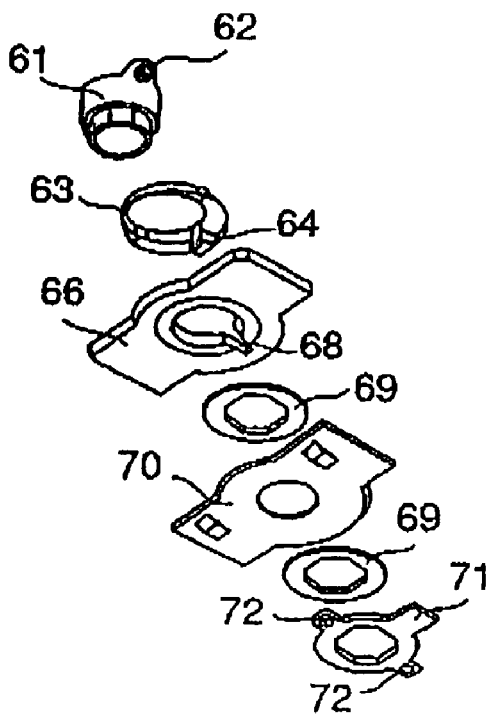

The following describes another preferred embodiment of the portable terminal according to the present invention with referring to FIGS. 8 to 11. Referring to FIG. 8, there is shown a perspective view for explaining a method of opening or closing the first casing 1 and the second casing 2 in the other preferred embodiment of the portable terminal. Referring to FIG. 9, there is shown a configuration diagram for explaining a rotating mechanism in the other preferred embodiment of the portable terminal of FIG. 8. Referring to FIG. 10, there is shown an exploded view of an embodiment of a rotating mechanism in the second embodiment of the portable terminal according to the present invention: (A) is a view as seen from the above and (B) is a view as seen from below. Referring to FIG. 11, there is shown a cross section of an embodiment of the rotating mechanism of FIG. 8. (A) is a diagram showing a configuration where the first casing 1 and the second casing 2 are superposed on each other and (B) is a diagram showing a configuration where the first casing 1 is rotated substantially 180 degrees relative to the second casing 2.

The casing 1 and the second casing 2 in FIG. 8 and FIG. 9 are each shown in a form of a rectangular solid from those in FIG. 1. In these diagrams, there are shown a rotating mechanism 20; a bracket 21 having a bearing hole 22 (FIG. 9) of an uneven shaft 62 provided on a rotator 61 of the rotating mechanism and fixed to the first casing 1; a spring 60; holes 75 and 76 for disposing the rotating mechanism 20 provided on the first casing 1 and the second casing 2; rotation brake depressions 77 and 78; a rotator 61 having the uneven shaft 62 passing through the hole 22 o the bracket 21 for inclining the first casing 1; a lever 63 having a protrusion 64 and fixed to the first casing 1 by means of a rotation brake projection 65; a sleeve 66 fixed to the side of the first casing 1 of the second casing 2 by inserting the rotator 61 rotatably and having a guide 67 having an inclined face 67a for providing the first casing 1 and the second casing 2 with a given angle after spacing the first casing 1 and the second casing 2 apart in the initial stage of the rotation of the first casing 1 by a contact of the protrusion 64 of the lever 63 and a depression 68 for positioning the protrusion 64 of the lever 63; a friction plate 69; a holder 70 having depressions 70a of a positioning latching mechanism associated with an active configuration where the first casing 1 is superposed on the second casing 2 and an inactive configuration where the first casing 1 is rotated substantially 180 degrees relative to the second casing 2 and fixed to the second casing 2 by inserting the rotator 61 rotatably; and a spring plate 71 made of an elastic body, having projections 72 forming a positioning latching mechanism for the first casing 1 and the second casing 2, and fixed to the rotator 61 to enable the rotator 61 to rotate inside the second casing 2.

Also in the preferred embodiment of FIG. 8, there is provided means for spacing the above the first casing 1 and the second casing 2 apart at least in the initial stage of the relative rotation of the first casing 1 and the second casing 2 and thereafter gradually increasing an angle formed between the faces having functions of the first casing 1 and the second casing 2 so as to reach a given angle.

More specifically, in the portable terminal according to the preferred embodiment shown in FIG. 8(A), the first casing 1 is coupled to the second casing 2 at the ends by means of the rotating mechanism 20 in the configuration where they are superposed on each other. With faces on the same side of the first casing 1 and the second casing 2 directed in the same direction, the first casing 1 is relatively rotatable to the second casing 2 as shown in FIGS. 8(B), (C), and (D). In addition, with the rotation, the first casing 1 is spaced away from the second casing 2 to prevent, for example, an operation unit 5 arranged on the surface of the second casing 2 facing the first casing 1, from being scratched or damaged. Furthermore, when the first casing 1 is rotated substantially 180 degrees from a position in which the first casing 1 is superposed on the second casing 2, the first casing 1 and the second casing 2 forms a given angle θ, which is the same as the angle of the inclined portion 23 of the first casing 1 provided on the side of the second casing 2. Therefore, for example, if the portable terminal 10 is a portable phone and if the first casing 1 is provided with a display unit 6 and the second casing 2 is provided with an operation unit 5, the display unit 6 is always visible. Furthermore, when using the portable phone, the display unit 6 tilts to a user, and therefore the operation unit 5 is easy to operate and the speaker 8 and the microphone 4 are brought close to the user's ear and mouth, respectively, in the portable phone, thereby improving the usability greatly.

In FIGS. 8 and 9, the rotating mechanism 20 is shown in detail in FIG. 10 and FIG. 11 and the bracket 21 has the bearing hole 22 for receiving the uneven shaft 62 arranged on the rotator 61 in the rotating mechanism 20 and used as a second base member fixed to the first casing 1. In other words, the first casing 1 is enabled to rotate in the direction away from the second casing 2 by means of the uneven shaft 61 inserted to pass through the bearing hole 22 of the bracket 21 and to rotate in the direction indicated by an arrow 24 in FIG. 8(B) around the rotating mechanism 20. The rotating mechanism 20 is provided with the sleeve 66 as a first base member having the depression 68 and the guideway 67 as described later. Thereby, the first casing 1 receives a force in the direction of spacing the face of the first casing 1 on the side of the second casing 2 away from the second casing 2 in the initial stage of the rotation, by which the first casing 1 is rotating as shown in FIG. 8(C) without contacting the second casing 2 while the angle formed between the first casing 1 and the second casing 2 is increased gradually with the rotation. Then, the first casing 1 is rotated substantially 180 degrees from the position in which the first casing 1 is superposed on the second casing 2 as shown in FIG. 8(D), by which there is formed a given angle θ, which is the same as the angle of the inclined portion 23 of the first casing 1 provided on the side of the second casing 2.

Regarding the first casing 1, the second casing 2, and the rotating mechanism 20, as shown in FIG. 9 and the cross section of FIG. 11, the bracket 21 is fixed to the first casing 1 and the rotating mechanism 20 is inserted into the holes 75 and 76 opened on the first casing 1 and the second casing 2, respectively, from under the second casing 2, by which the sleeve 66 shown in FIG. 9 of the rotating mechanism 20 is fixed to the second casing 2 on the side of one casing. As shown in FIG. 10 and FIG. 11, the rotating mechanism 20 has the rotator 61 having the uneven shaft 62, the uneven shaft 62 of the rotator 61 is inserted into the bearing hole 22 of the bracket 21 and fixed to the first casing 1 with the first casing 1 enabled to rotate by the uneven shaft 62, and the spring 60 is attached to the bracket 21 from around the uneven shaft 62, thereby applying a force of pressing the first casing 1 to the second casing 2. Furthermore, the rotating mechanism 20 comprises: the lever 63 having the protrusion 64 and the rotation brake projection 65 and mating the protrusion 65 with the rotation brake depressions (holes) 77 and 78 (FIG. 9) provided in the hole 75 of the first casing 1; the sleeve 66 having the guide 67 and the depression 68 on the opposed face where the first casing 1 faces to the second casing 2 and used as the first base member fixed to the second casing 2 on the side of the first casing 1; the holder 70 fixed and provided with the depressions 70a of the positioning latching mechanism in the position in which the first casing 1 is superposed on the second casing 2 and in the position in which the first casing 1 is rotated substantially 180 degrees from the above position on the opposite side of the second casing 2 from the first casing 1; and the spring plate 71 made of an elastic body, having the protrusion 72 forming the positioning latching mechanism for the first casing 1 and the second casing 2, and fixed to the rotator 61 so as to enable the rotator 61 to rotate inside the second casing 2.

Figure 11A:
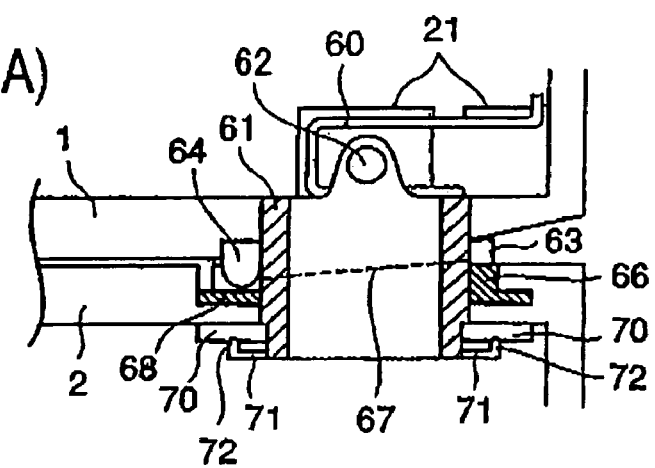
FIG. 11(A) is a diagram showing a configuration where the first casing and the second casing are superposed on each other and FIG. 11(B) is a diagram showing a configuration where the first casing is rotated substantially 180 degrees relative to the second casing.

As shown in FIG. 11(A) showing the above configuration, in the configuration where the first casing 1 is superposed on the second casing 2 (closed configuration), the protrusion 64 of the lever 63 is mated with the depression 68 of the sleeve 66 and the first casing 1 is pressed against the second casing 2 with a pressing force of the spring 60, by which the first casing 1 is pressed to the second casing 2. Subsequently, when the first casing 1 is rotated in the direction indicated by the arrow 24 as shown in FIG. 8(B) in this condition, the protrusion 64 of the lever 63 runs on the inclined face 67a on the guide 67 of the sleeve 66 from the depression 68 and pushes up the first casing 1 against the pressing force of the spring 60, by which the first casing 1 is kept apart from the second casing 2. Therefore, even if the first casing 1 is further rotated in the direction indicated by the arrow 24, the first casing 1 is rotating as shown in FIG. 8(C) without contacting the operation unit 5 on the second casing 2 or the opposed face 2a of the second casing 2, while the protrusion 64 of the lever 63 is gradually pushed up along the inclined face 67a with the rotation, thereby gradually increasing the angle formed between the first casing 1 and the second casing 2. Then, if the first casing 1 rotates substantially 180 degrees (in the opened condition) from the position in which the first casing 1 is disposed on the second casing 2 as shown in FIG. 1(D), the protrusion 64 of the lever 63 reaches the highest position of the guide 67 of the sleeve 66 as shown in FIG. 11(B) and the first casing 1 has a given angle θ (See FIG. 8(D)), which is the same as the angle of the inclined portion 23 of the first casing 1 provided on the side of the second casing 2.

Figure 11B:
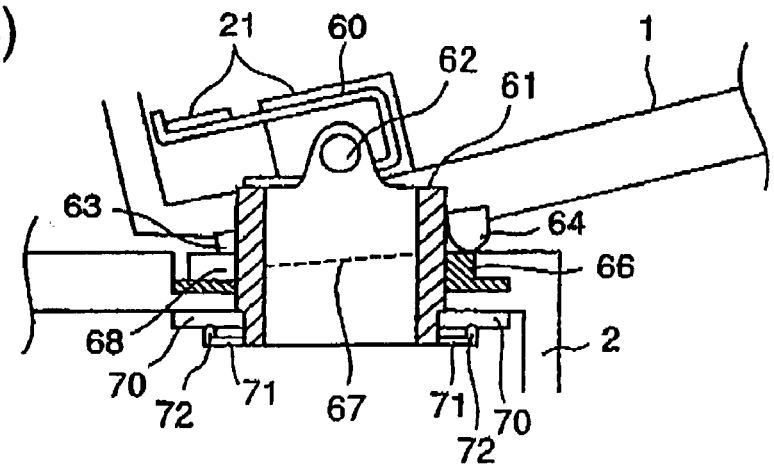

In FIG. 11(A) showing the configuration where the first casing 1 is superposed on the second casing 2 (closed condition) and FIG. 11(B) showing the configuration where the first casing 1 is rotated substantially 180 degrees (opened configuration), the protrusion 72 on the spring plate 71 is engaged with the depression 70a of the positioning latching mechanism provided on the holder 70, thereby achieving the positioning. In this manner, the first casing 1 and the second casing 2 are held in both of the closed configuration and the opened configuration.

Figure 12:
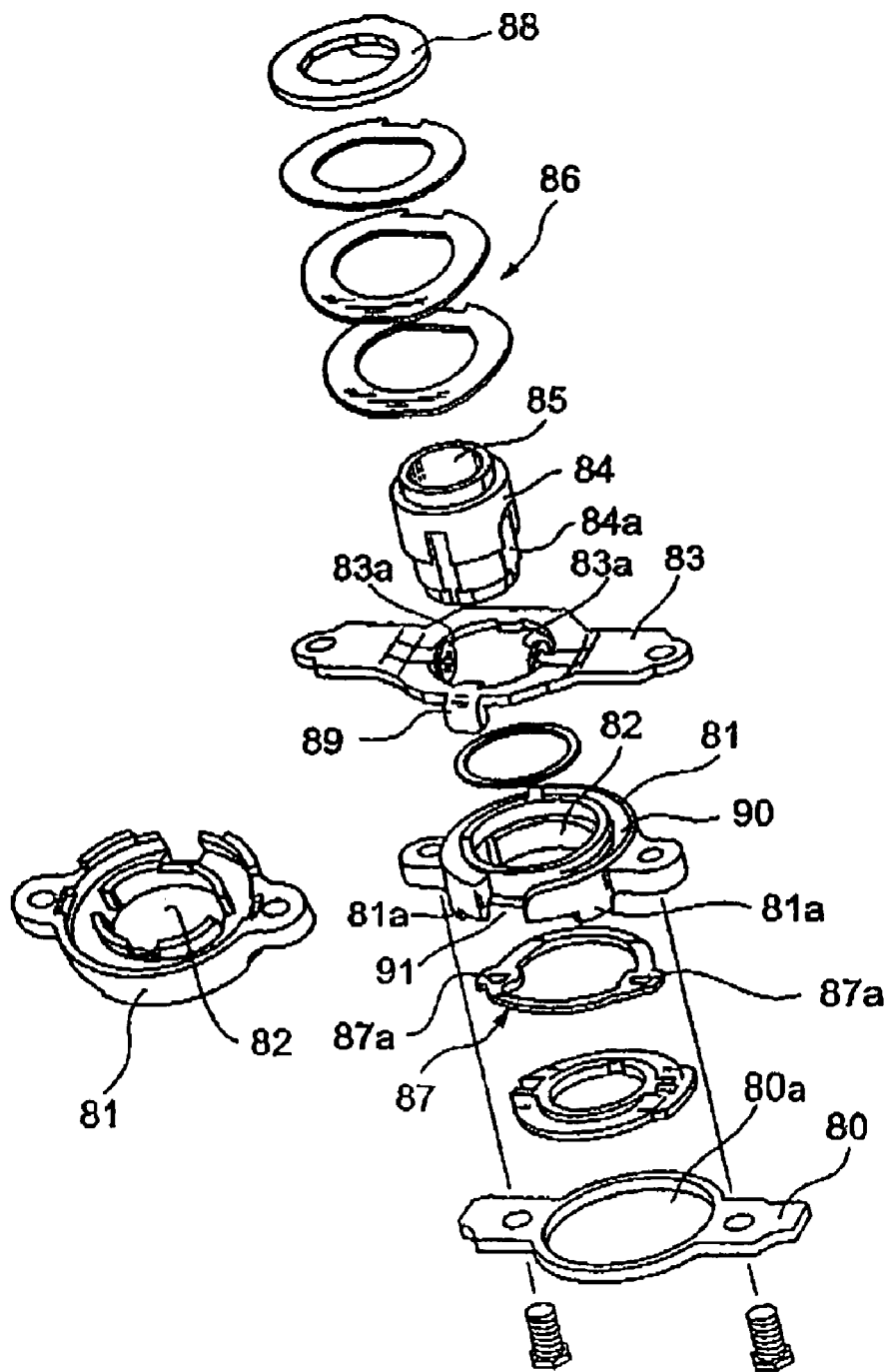
FIG. 12 is an exploded perspective view of an embodiment of a rotating mechanism in yet another preferred embodiment of the portable terminal.
Figure 13:
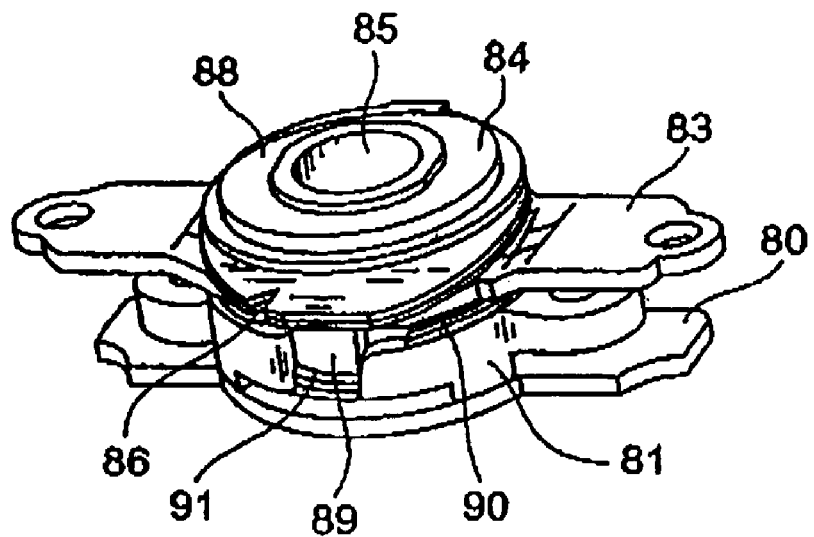
FIG. 13 is a perspective view of a built-up condition of the rotating mechanism in the preferred embodiment of the portable terminal of FIG. 12.
Figure 14:
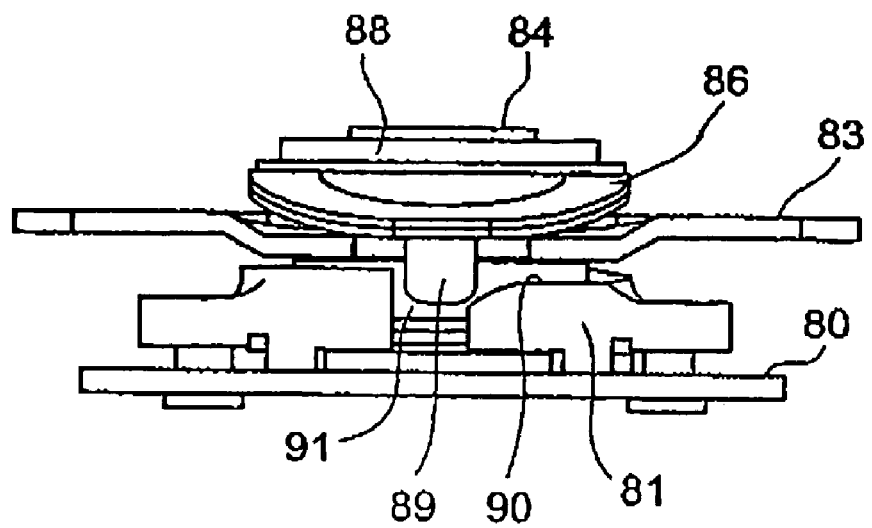
FIG. 14 is a front view of the built-up condition of the rotating mechanism in the preferred embodiment of the portable terminal of FIG. 12.
Figure 15A:
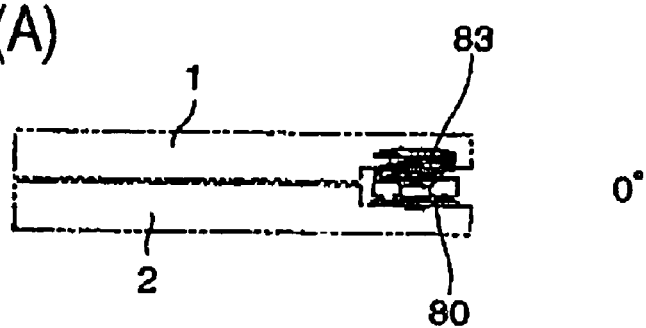
FIGS. 15(A) and 15(B) are side views for the preferred embodiment of the portable terminal of FIG. 12.
Figure 15B:
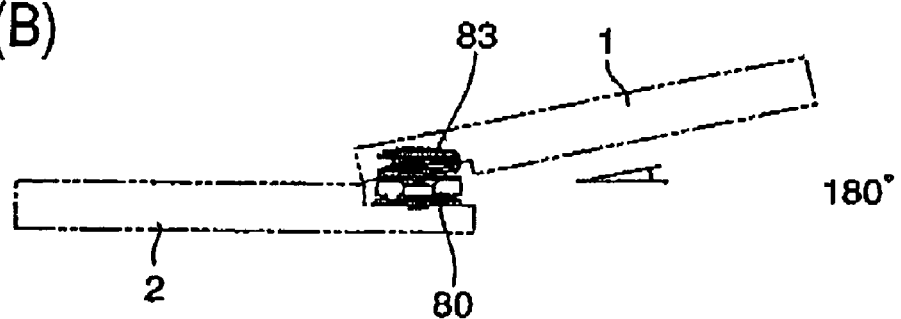
Figure 16A:
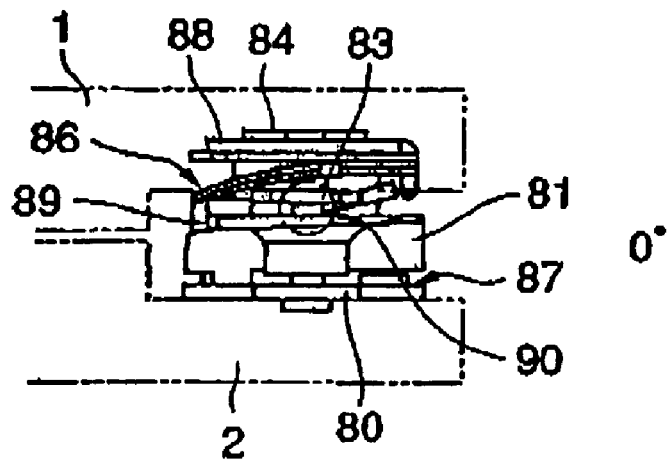
FIG. 16 is an enlarged explanatory side view for a configuration (A) where the first casing and the second casing are superposed on each other, a configuration (B) where the first casing is rotated 90 degrees, and a configuration (C) where it is rotated 180 degrees, with respect to the rotating mechanism in the preferred embodiment of the portable terminal of FIG. 12.
Figure 16B:
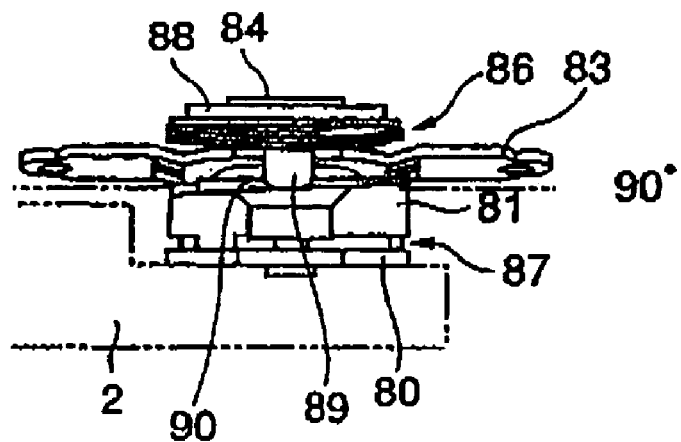
Figure 16C:
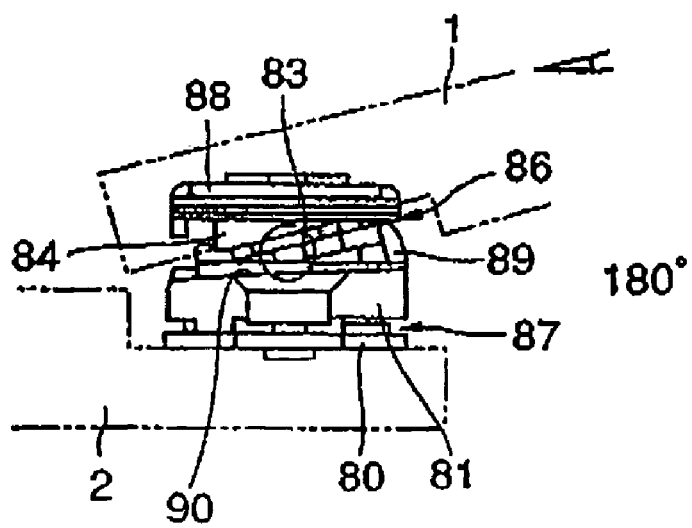
Figure 17A:
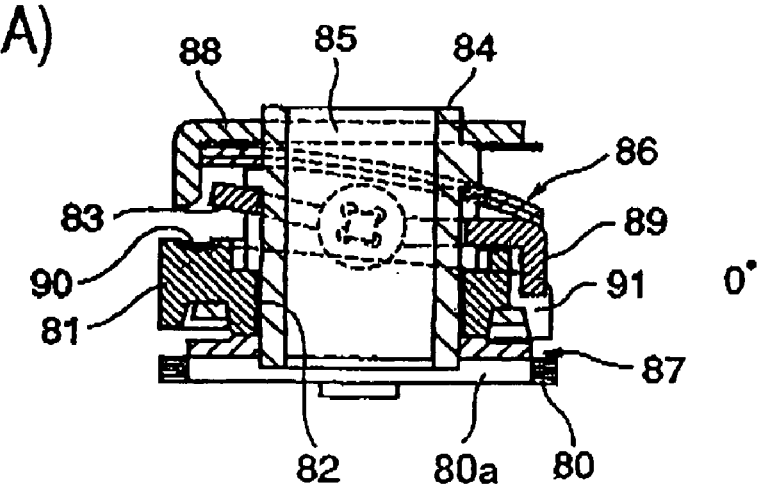
FIG. 17 is an enlarged cross section for a configuration (A) where the first casing and the second casing are superposed on each other and a configuration (B) where the first casing is rotated 180 degrees, with respect to the rotating mechanism in the preferred embodiment of the portable terminal of FIG. 12.
Figure 17B:
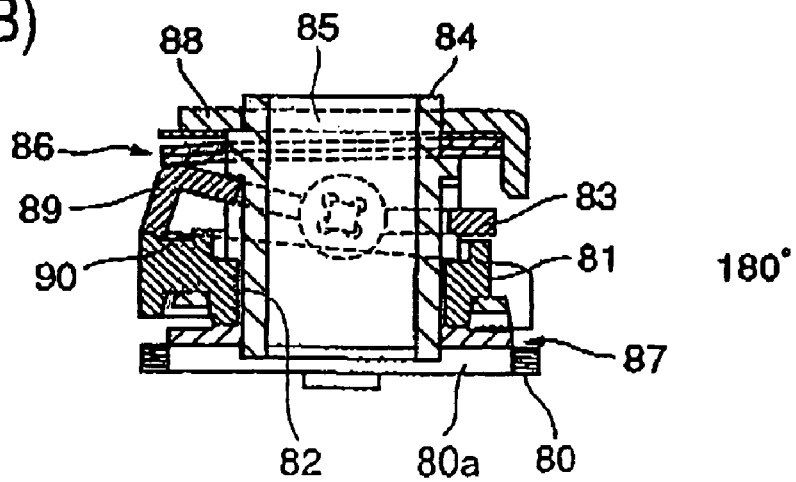

The following describes yet another preferred embodiment of the portable terminal according to the present invention with reference to FIGS. 12 to 17. Referring to FIG. 12, there is shown an exploded perspective view of a preferred embodiment of a rotating mechanism in the embodiment of the portable terminal of FIG. 12. Referring to FIG. 13, there is shown a perspective view of a built-up condition of the rotating mechanism in the preferred embodiment of the portable terminal of FIG. 12. Referring to FIG. 14, there is shown a front view of the built-up condition of the rotating mechanism in the preferred embodiment of the portable terminal of FIG. 12. Referring to FIG. 15, there is shown a side view for an explanation in the preferred embodiment of the portable terminal of FIG. 12. Referring to FIG. 16, there is shown an enlarged explanatory side view for a configuration (A) where the first casing 1 and the second casing 2 are superposed on each other, a configuration (B) where the first casing 1 is rotated 90 degrees, and a configuration (C) where it is rotated 180 degrees, regarding the rotating mechanism in the preferred embodiment of the portable terminal of FIG. 12. Referring to FIG. 17, there is shown an enlarged cross section for a configuration (A) where the first casing 1 and the second casing 2 are superposed on each other and a configuration (B) where the first casing 1 is rotated 180 degrees, regarding the rotating mechanism in the preferred embodiment of the portable terminal of FIG. 12.

The first casing 1 and the second casing 2 in FIG. 15 are shown each in a form of a rectangular solid from those in FIG. 1 for simplification of the description similarly to the preferred embodiment of FIG. 8. In FIG. 16, there are shown a fixture 80, a first base member 81, a mounting hole 82 for a rotator 84, a second base member 83 made of a bracket, the rotator 84, a hollow hole 85, an elastic body 86, a positioning latching mechanism 87, a protrusion 89, a guideway (guide) 90, and a depression 91.

In the preferred embodiment of FIG. 12, the uneven shaft 62 of FIG. 10 is not disposed on the rotator 61, but disposed on the second base member 83 so as to be free to tilt relatively to the rotator 84 and there is provided means for spacing the first casing 1 away from the second casing 2 at least in the initial stage of the relative rotation of the first casing 1 and the second casing 2 and thereafter gradually increasing an angle formed between faces of the first casing 1 and the second casing 2 having functions to reach a given angle. Therefore, in the preferred embodiment of FIG. 12, for example, the first base member 81 is provided on the second casing 2 and the second base member 83 is provided on the first casing 1 as shown in FIG. 15 and the rotator 84 provided on the second base member 83 is inserted into and engaged with the mounting hole 82 provided on the first base member 81 as shown in FIG. 12 to couple the second casing 2 to the first casing 1, thereby enabling the first casing 1 to relatively rotate substantially in parallel from a position in which the first casing 1 is superposed on the second casing 2 so as to expose the operation unit 5.

In the condition where the second casing 2 and the first casing 1 are superposed on each other, the elastic body 86 presses one side of the second base member 83, by which the second base member 83 is relatively moved so as to tilt and biased, and thereby the first casing 1 is closed and biased to the second casing 2 in the superposed facedown direction. In other words, assuming that the elastic body 86 is, for example, a plate spring with a biasing force generated thereby biased to one side, the second base member 83 is enabled to tilt and automatically presses the predetermined side when the portable terminal is put in the superposed configuration by an arrangement of a form constantly pressing one side of the second base member 83, which is to be the side where the first casing 1 is inclined in the facedown direction in the superposed configuration, thereby causing the elastic body 86 to tilt and bias the second base member 83 in the superposed configuration and closing and biasing the first casing 1 relative to the second casing 2.

More specifically, it is arranged so that: there is provided the guide 90 abutted by the protrusion 89 provided on the second base member 83 on the side of the first base member 81; the elastic body 86 causes the protrusion 89 to always contact pressing against the guideway 90 so as to slide freely; the protrusion 89 is mated with the guideway 90 or the position opposed to the protrusion 89 in the superposed condition (in the configuration where the second casing 2 and the first casing 1 are superposed on each other); there is provided the depression 91 allowing the second base member 83 to tilt; the second base member 83 is tilted and biased by dropping and biasing the protrusion 89 to the depression 91 by means of the elastic body 86 in the superposed configuration; and the first casing 1 may be biased to the second casing 2 in the superposed facedown direction.

This enables the protrusion 89 always in the superposed configuration can be tilted while being positioned at the depression 91 with a simple arrangement. In addition, the elastic body 86 always biasing and pressing one side of the second base member 83 tilts and biases the second base member 83 in the superposed configuration, by which the first casing 1 is closed and biased to the second casing 2.

Furthermore, the guideway 90 is provided on the face of the opposite side from that of the fixture 80 where the mounting hole 80a of the first base member 81 is provided. The guideway 90 is configured so that the second base member 83 relatively moves to tilt to the rotator 84 by sliding of the protrusion 89 of the second base member 83 along the inclined face of the guideway 90 when the rotator 84 rotates relative to the mounting hole 82 by the relative rotation of the first casing 1 to the second casing 2. For example, when the first casing 1 is relatively rotated 180 degrees substantially in parallel to the superposed surface and the casings are provided in a substantially linear connected row arrangement so as to expose the superposed surface, the protrusion 89 slides along the inclined face of the guideway 90 and thereby the second base member 83 moves to tilt relatively to the rotator 84, and the first casing 1 and the second casing 2 are provided in a connected row arrangement with the first casing 1 automatically inclined upward relative to the second casing 2 disposed in the substantially horizontal direction. With this arrangement, the second base member 83 moves so as to tilt relatively to the rotator 84 by sliding of the protrusion 89 abutting the guideway 90 during the rotation. Thereby, the second base member 83 moving to tilt with the rotation causes the first casing 1 automatically to be inclined slightly upward relative to the second casing 2 disposed in the substantially horizontal direction, by which the casings are provided in a substantially linear connected row arrangement.

In other words, if the second casing 2 is assumed to be a main body 2 provided with the operation unit 5 and the first casing 1 is assumed to be a superposing unit 1 provided with the display unit 6, the superposing unit 1 can be coupled to the main body 2 in the substantially horizontal direction so as to rotate freely by superposing and coupling the casings at their ends via the rotating mechanism. While the operation unit 5 is not used, the main body 2 and the superposing unit 1 are provided so as to be vertically superposed on each other in such a way as to cover the operation unit 5 to achieve a compact form. In the compact superposed condition, the display unit 6 is arranged on the upper surface of the superposing unit 1, and therefore the display unit 6 is visible though a user cannot operate the operation unit 5. In addition, with such an arrangement that the display unit 6 has functions such as, for example, with a function of displaying date or a calendar preset by the operation unit 5 or a function of displaying data communications (for example, displaying an incoming call for a portable phone), various uses are enabled since the display unit 6 is visible, thereby expanding in application, improving functionality, and coming in very useful and thus increasing its practicability and commercial value.

Furthermore, when operating the operation unit 5, the operation unit 5 can be exposed by rotating the superposing unit 1 substantially 180 degrees in the substantially horizontal direction, instead of exposing the operation unit 5 by a vertical rotation of the superposing unit 1. Therefore, even if the functionality is increased by providing the display unit 6 on the upper side, which is to be the exposed side when the operation unit 5 is covered with the superposing unit 1 as stated above, the operation unit 5 can be exposed by rotating the superposing unit 1 in the horizontal direction. Therefore, even if the operation unit 5 is exposed, the display unit 6 is still in the exposed condition, thereby enabling the use of operating the operation unit 5 with a display on the display unit 6 like a conventional one.

Furthermore, since the operation unit 5 can be exposed with a lateral pressing operation since the horizontal rotation is applied instead of the vertical rotation, the opening action is easy in comparison with the conventional vertical rotation, and thus it becomes easy to handle. In this condition, the superposing unit 1 is automatically inclined slightly upward by the rotation for opening, by which the display 6 becomes easily viewable.

The preferred embodiment of FIG. 12 will be described in detail further. Similarly to the preferred embodiment of FIG. 8 stated above, the preferred embodiment of FIG. 12 is arranged so that the display unit 6 of the superposing unit 1 is inclined slightly upward relative to the main body 2 so as to be easily viewable when the superposing unit 1 is rotated substantially 180 degrees in the horizontal direction so that the main body 2 and the superposing unit 1 are provided in a liner connected row arrangement from the position in which the first casing 1 (superposing unit 1) and the second casing 2 (the main unit 2) are superposed on each other.

In other words, as apparent from FIG. 12, the rotator 84 is provided in the rotation brake condition on the second base member 83 so as to rotate with the second base member 83 with the rotation of the superposing unit 1. The second base member 83 is free to tilt relatively to the rotator 84 with the direction substantially perpendicular to the direction of the rotating shaft of the rotator 84 as a pivot shaft direction. In addition, the protrusion 89 is provided in a hanging condition on the second base member 83, and the inclined guideway 90 abutted by the protrusion 89 is provided in a circumferential direction on the side of the first base member 81 provided with the mounting hole 82, namely, on the fringe of the mounting hole 82. The protrusion 89 is contacted pressing against the guideway 90 by means of the elastic body 86 so as to be free to slide along the guideway 90.

More specifically, the guideway 90 is configured so that the second base member 83 moves to tilt relatively to the rotator 84 by sliding of the protrusion 89 along the inclined face of the guideway 90 when the rotator 84 rotates relative to the mounting hole 82 with the relative rotation of the superposing unit 1 to the main body 2.

In other words, when the superposed surface is exposed by relatively rotating the upper superposing unit 1 substantially 180 degrees substantially parallel to the superposed surface to achieve the substantially linear connected row arrangement from the position in which the main unit 2 and the superposing unit 1 are superposed on each other vertically in substantially parallel, the protrusion 89 moves to slide along the guideway 90 provided in the circumferential direction and having an upward inclined face, by which the second base member 83 moves to tilt relative to the rotator 84 by the inclination of the guideway 90, and therefore the superposing unit 1 automatically inclines slightly upward relative to the main unit 2 disposed in the substantially horizontal direction to be put in the substantially linear connected row arrangement. In addition, there is provided the positioning latching mechanism 87 for positioning and latching the rotator 84 in the superposed position (0-degree rotated position) and 180-degree rotated position so as to achieve positioning and latching in the position in which the superposing unit 1 is superposed on the main body 2 in such a way as to cover the main body 2 and in the position in which the superposing unit 1 and the main body 2 are provided in a linear connected row arrangement.

Furthermore, the first base member 81 having the mounting hole 82 is provided on the fixture 80 and the rotator 84 having the second base member 83 is engaged so as to be free to rotate with the mounting hole 82 of the first base member 81. The rotator 84 is inserted to pass through the through-hole of the second base member 83, and a pair of uneven shaft branches 83a protruding inwardly from the through-hole and oppositely disposed is engaged with an oblong engagement groove 84a engraved halfway in the axial direction of the rotator 84 so as to achieve an engagement in the rotation brake condition. In addition, the rotator 84 is supported removably in the through-hole of the second base member 83 so that the second base member 83 is pivotable (tilt freely) in the direction perpendicular to the axis of the rotator 84 engaged with the mounting hole 82 of the fixture 80.

Furthermore, a cut-off tongue piece is provided in a hanging condition as the protrusion 89 on the second base member 83. The guideway 90 abutted by the protrusion 89 is formed on the upper face of a half-round portion of the mounting hole 82 of the first base member 81 and formed on the upward inclined face. Furthermore, a plate spring engaged to provide a covering with the rotator 84 and pressing the second base member 83 is put as the elastic body 86 between the rotator and a coupling unit 88 to prevent it from falling off. The elastic body 86 presses the second base member 83 with pressure so that the protrusion 89 is contacted pressing against the guideway 90.

Thereby, the protrusion 89 slides along the guideway 90 and the second base member 83 moves so as to tilt along the inclination of the guideway 90, by which the display unit 6 automatically inclines so as to be easily viewable during the rotation for opening. Additionally, the elastic body 86 enables the rotation without wobbling in the free stop condition.

In this preferred embodiment, the elastic body 86 is formed into a shape of generating a biasing force tilting the second base member 83 in such a direction that the superposing unit 1 can be biased in the superposed facedown direction so as to function as the elastic body 86 biasing the first casing 1(the superposing unit 1) to the second casing 2 (the main body 2). In other words, the elastic body 86 is formed of a plate spring applying the biasing force to one side and is engaged to provide a covering with the rotator 84 as stated above so as to press only the given side of the second base member 83 constantly.

Describing the above further, the guideway 90 abutted by the protrusion 89 provided on the second base member 83 is provided on the half-round portion around the mounting hole 82 of the first base member 81, and the elastic body 86 constantly presses the side on which the protrusion 89 is provided against the guideway 90 so as to be free to rotate. The guideway 90 is provided with the depression 91 allowing the protrusion 89 to drop into it so that the second base member 83 moves so as to tilt when the main body 2 and the superposing unit 1 are superposed on each other. The elastic body 86 constantly applies a pressure on the side of the protrusion 89 to drop and bias the protrusion 89 to the depression 91, thereby tilting and biasing the second base member 83, so that the superposing unit 1 can be closed and biased in the superposed facedown direction.

In other words, the second base member 83 is free to tilt relatively to the rotator 84 with the direction substantially perpendicular to the direction of the rotating shaft of the rotator 84 as a direction of the pivot shaft. When the main body 2 and the superposing unit 1 are superposed on each other, the protrusion 89 is positioned in the depression 91 and thereby the second base member 83 can move to tilt in the configuration. Then, the elastic body 86 constantly pressing the protrusion 89 tilts and biases the second base member 83, thereby closing and biasing the superposing unit 1 to the main body 2 in the superposed facedown direction.

Therefore, the elastic body 86 is made of a plurality of plate springs superposed with the generated biasing force biased to one side, configured so as to rotate with the rotator 84 and the second base member 83 by being engaged to provide a covering with the rotator 84 in the rotation brake condition, and formed in a shape of constantly pressing one side of the second base member 83, which is to be the side on which the first casing 1 is inclined in the facedown direction in the superposed condition. In other words, in this preferred embodiment, the mounting base 83 member is always pressed in the side where the protrusion 89 is provided. Then, in the superposed configuration, the second base member 83 can move to tilt and the predetermined side is automatically pressed, by which the elastic body 86 tilts and biases the second base member 83 in the superposed condition, and thus the first casing 1 is closed and biased to the second casing 2.

In other words, in the superposed configuration, the protrusion 89 under pressure drops into the depression 91, by which the second base member 83 is allowed to tilt relative to the rotator 84 (to the second casing 2). The constant pressure of the elastic body 86 to the protrusion 89 tilts and biases the second base member 83, by which the first casing 1 is closed and biased relative to the second casing 2.

The positioning latching mechanism comprises engagement projections 81*a* provided on the periphery of the mounting hole 82 of the first base member 81 and a ring member 87 having projections 87*a* in the peripheral portion. The ring member 87 is configured so as to rotate with the rotator 84. With the projections 87*a* of the ring member 87 abutting the engagement projections 81*a*, the rotating mechanism is locked at the predetermined position.

Figure 18:
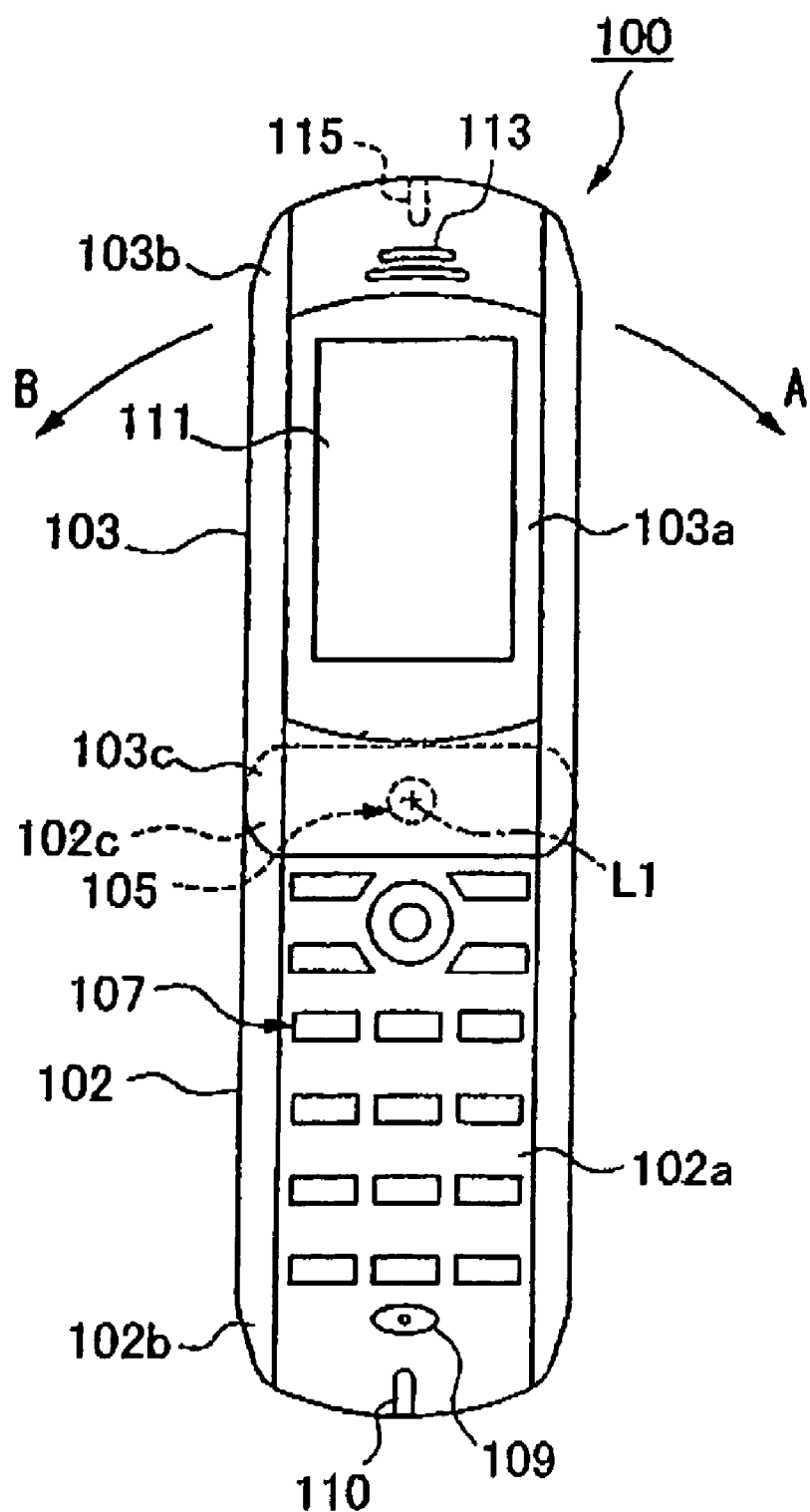
FIG. 18 is a schematic plan view showing an opened configuration of the first and second casings forming the portable phone as an example of the portable terminal of the preferred embodiment of FIG. 12.

Referring to FIGS. 18 to 22, there is shown a further embodiment of a portable phone. As shown in FIGS. 18 and 19, the portable phone (portable terminal) according to this embodiment comprises a first casing 102, a second casing 103 that can be superposed on the first casing 102 in the direction of thickness thereof, and coupling means 105 or rotating mechanism for coupling these two casings 102 and 103 rotatably around a first axis (a first reference axis) L1 extending in the direction of the thickness. The coupling means 105 is arranged so as to connect respective ends (one end of each casing) 102*c* and 103*c* of the two casings 102 and 103. In the configuration where the two casings 102 and 103 are superposed on each other, both of opposed faces 102*a* and 103*d* of the opposing casings 102 and 103 are formed in a substantially rectangular form.

There is provided an operation unit 107 made of a speaking key, a clearing key, and other various depressible operation keys on the opposed face 102*a* to the second casing 103 substantially perpendicular to the direction of thickness of the first casing 102. The operation unit 107 is covered with the second casing 103 in the closed configuration where the first and second casings 102 and 103 are superposed on each other. Furthermore, on the opposed face 102*a*, a microphone unit 109 is provided at the front end (the other end) 102*b* of the first casing 102 located in the opposite side to the rear end 102*c* and a depression 110 concave in the direction of the thickness is formed there, too.

There is provided a display unit 111 for displaying various information on the outer surface 103*a* of the second casing 103 directed to substantially the same direction as the opposed face 102*a* of the first casing 102. The display unit 111 is exposed outwardly independently of whether the two casings 102 and 103 are opened or closed. On the outer surface 103*a*, a speaker 113 is provided at the front end (the other end) 103*b* of the second casing 103 located on the opposite side to the read end 103*c*.

Figure 20A:
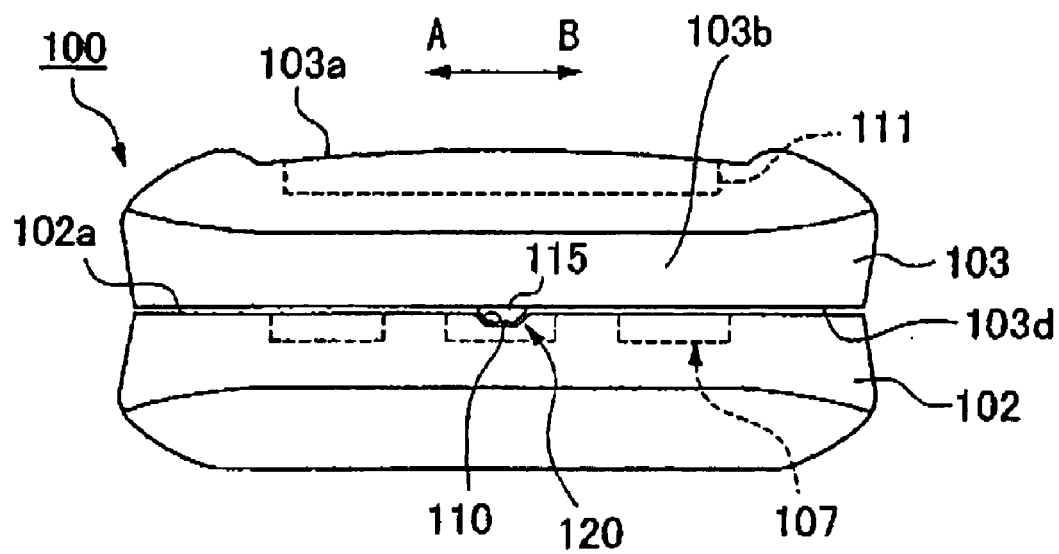
FIG. 20(A) is a schematic front view and FIG. 20(B) is an enlarged front view showing a pivot portion of FIG. 20(A)

Furthermore, as shown in FIG. 20(A), there is attached a projection 115 protruding from the opposed face 103*d* of the second casing 2 located on the opposite side to the outer face 103*a* to the front end 103*b*. The projection 115 is formed of an elastic body such as rubber and it is inserted into the depression 110 formed on the first casing 102 in the closed configuration where the two casings 102 and 103 are superposed on each other.

Figure 20B:
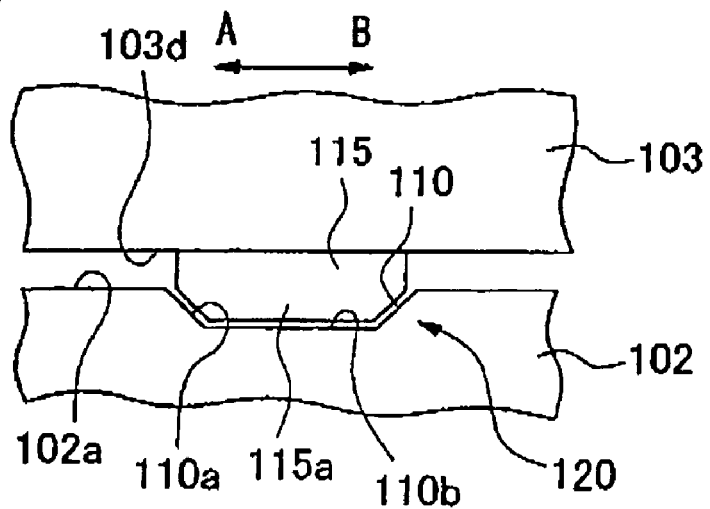

As shown in FIG. 20(B), a side wall 110*a* of the depression 110 is an inclined face gradually broadening toward the opposed face 102*a* of the first casing 102 from a bottom wall surface 110*b* of the depression 110 along the rotation direction (AB direction) of the two casings 102 and 103. The tip 115*a* of the projection 115 is tapered in such a way that a width in the AB direction is reduced gradually toward the tip. The depression 110 and the projection 115 form engaging means 120 for holding the two casings 102 and 103 in the closed condition where they are superposed on each other.

Figure 21:
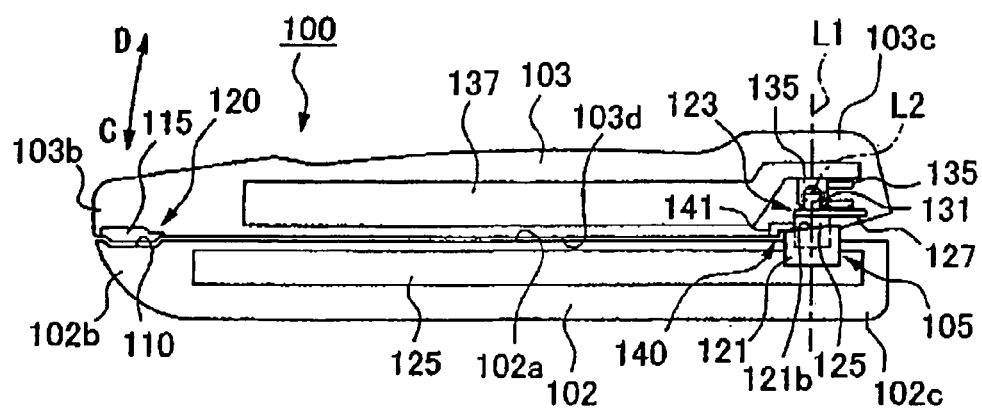
FIG. 21 is a cross section showing engaging means and coupling means in the portable phone in FIG. 18.

As shown in FIG. 21, the coupling means 105 comprises a cylindrical member 121 having a substantially cylindrical form provided protruding form the opposed face 102*a* of the first casing 102 and a coupling unit 123 attached so as to be free to rotate around the first axis L1 to the cylindrical member 121.

A lower end of the cylindrical member 12 in the axis direction is attached to a frame 125 fixed to the inside of the first casing 102 so as to be unmovable. An upper end of the cylindrical member 121 in the axis direction is inserted into the inside from the opposed face 103*d* of the second casing 103 together with the coupling unit 123.

Figure 22:
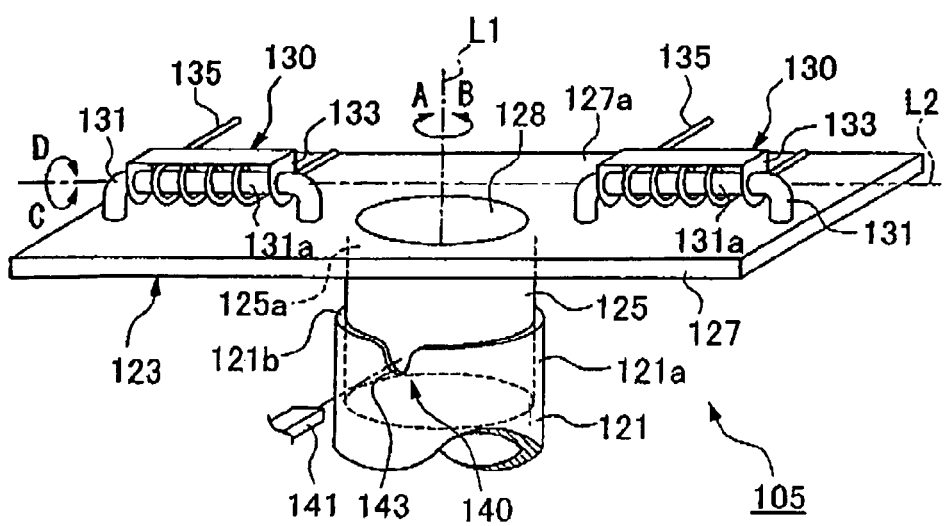
FIG. 22 is an enlarged perspective view showing the coupling means in the portable phone in FIG. 18.

As shown in FIG. 22, the coupling unit 123 comprises a first rotating unit 125 having a substantially cylindrical form attached so as to be free to rotate around the first axis L1 to the cylindrical member 121, a tabular portion 127 formed on the side of an upper end 125*a* of the first rotating unit 125 and having a plane perpendicular to the first axis L1, and a pair of biasing means 130 arranged on the side of an upper face 127*a* of the tabular portion 127 and for biasing the two casings 102 and 103 in the direction of bringing them close to each other around a second axis (a second reference axis) L2 perpendicular to the first axis L1.

The first rotating unit 125 has almost the same outside diameter as the inside diameter of the cylindrical member 121 and its upper end 125*a* is held protruding from an upper end 121*a* of the cylindrical member 121. The tabular portion 127 is formed integrally with the first rotating unit 125 and the cylindrical member 121, the first rotating unit 125, and the tabular portion 127 form a through-hole 128 passing through to the other side in the direction of the axis L1. The through-hole 128 causes the internal spaces of the two casings 102 and 103 to communicate with each other.

The pair of biasing means 130 are symmetrically located with the first axis L1 arranged therebetween. The biasing means 130 are fixed to the upper surface 127*a* of the tabular portion 127 and comprises a U-shaped shaft member 131 having a columnar shaft portion 131*a* arranged in the direction of the second axis L2, a second rotating unit 133 attached to the columnar shaft portion 131*a* so as to be free to rotate around the second axis L2, and a torsion spring 135 wound around the columnar shaft portion 131*a* and biasing the second rotating unit 133 relative to the tabular portion 127 in one direction (direction C) around the second axis L2.

As shown in FIG. 21, the second rotating unit 133 is attached so as to be unmovable to a frame 137 fixed the inside of the second casing 103 in such a way that the second axis I2 is perpendicular to the longitudinal direction of the two casings 102 and 103 toward the front ends 102*b* and 103*b* from the rear ends 102*c* and 103*c*.

With the arrangement of the biasing means 130, the second casing 103 is biased so as to rotate in the direction C around the second axis I2 relative to the first casing 102 by means of the biasing force of the torsion spring 135. Therefore, in the closed configuration where the two casings 102 and 103 are superposed on each other, the front ends 102*b* and 103*b* of the two casings 102 and 103 are close to each other and the projection 115 can be reliably inserted into the depression 110.

Furthermore, the coupling means 105 is provided with guide means 140 for pivoting the two casings 102 and 103 each other around the second axis L2 in conjunction with the opening or closing operation of relatively rotating the casings 102 and 103 around the first axis L1.

In other words, the guide means 140 comprises an end face 121*b* on the side of the upper end of the cylindrical member 121 and a rod member 141 fixed to the inside of the second casing 103. The rod member 141 can abut the end face 121*b* of the cylindrical member 121 by means of a biasing force of the torsion spring 135 and the end face 121b is inclined in the longitudinal direction of the two casings 102 and 103.

Therefore, when opening the casings 102 and 103 with the relative rotation around the first axis L1, the second casing 103 pivots in the direction (direction D) against the biasing force of the torsion spring 135 relative to the first casing 102, thereby spacing apart the front ends 102b an d103 of the two casings 102 and 103. When closing the casings 102 and 103 with the relative rotation around the first axis L1, the second casing 103 pivots in the biasing direction (direction C) of the torsion spring 135 relative to the first casing 102, thereby bringing the front ends 102b and 103b of the casings 102 and 103 close to each other.

In the closed configuration where the casings 102 and 103 are superposed on each other, the rod member 141 does not abut the end face 121b. In other words, as shown in FIG. 22, a depression 143 concave in the direction of the first axis L from the end face 121b is formed in the portion of the end face 121b where the rod member 141 is located in the configuration where the casings 102 and 103 are closed and therefore the rod member 141 is inserted into the depression 143 in the closed condition of the casings 102 and 103. In the configuration where the rod member 141 is inserted into the depression 143, the rod member 141 does not abut the end face 121b and the front ends 102b and 103b of the casings 102 and 103 are pressed against each other by means of the biasing force of the torsion spring 135.

The following describes a usage of the potable phone 100 as configured above. When carrying the portable phone 100 in a bag or a pocket of clothes, as shown in FIG. 19, the two casings 102 and 103 are closed and superposed on each other. In this condition, as shown in FIG. 20, the front ends 102b and 103b of the casings 102 and 103 are brought close to each other by the biasing force of the biasing means 130 and the projection 115 is inserted into the depression 110. Therefore, the casings 102 and 103 are engaged with each other. Accordingly, even if an external force is applied to relatively rotate the casings 102 and 103 around the first axis L1, the relative positions of the casings 102 and 103 do not easily move, and therefore the casings 102 and 103 can be kept in the accurate relative positions.

To use the portable phone 100 in this condition, as shown in FIG. 18, the second casing 103 is rotated 180 degrees around the first axis L1 relative to the first casing 102 to open the casings 102 and 103 each other.

When opening, the front end 115a of the tapered projection 115 moves along the inclined side face 110a of the depression 110. Furthermore, in this configuration, the front ends 102b and 103b of the two casings 102 and 103 move gradually in the direction of being spaced from each other around the second axis L2 by means of the guide means 140, thereby generating a minute gap between the opposed face 102a of the first casing 2 and the projection 115. Therefore, the projection 115 does not contact the opposed face 102a of the first casing 102.

For example, if a call is started in this configuration, the operation unit 107 is operated before the call is started through the microphone unit 109 and the speaker 113. For example, if an e-mail is received, the operation unit 107 is operated to display the content of the received e-mail on the display unit 111.

As stated above, according to the portable phone 100, the casings 102 and 103 are provided with the depression 110 and the protrusion 115, respectively, and the coupling means 5 is provided with the biasing means 130, by which the two casings 102 and 103 can be maintained in the closed condition and the casings 102 and 103 can be held in the relative accurate positions. Therefore, it is possible to prevent the casings 102 and 103 from opening unexpectedly when carrying the portable phone 100 with the casings 102 and 103 closed each other.

In addition, when viewing the display unit exposed to the outside in the configuration where the two casing s102 and 103 are closed each other, the casings 102 and 103 do not rotate unexpectedly, and thereby secure a good configuration of the portable phone 100.

Furthermore, when opening the casings 102 and 103 with the relative rotation, the front ends 102b and 103b of the casings 102 and 103 move gradually in the direction of being spaced from each other around the second axis L2, by which it is possible to prevent the opposed face 102a of the first casing 102 and the operation unit 107 provided on the opposed face 102a from being damaged by the projection 115 provided on the second casing 103.

Still further, when opening the casings 102 and 103 with the relative rotation from the position in which they are closed each other, the tip 15a of the tapered projection 115 moves along the side wall 110a of the depression 110, thereby enabling the projection 115 to get out of the depression 110 smoothly.

Subsequently, referring to FIG. 23, there is shown a further preferred embodiment of the present invention. While this embodiment has the same basic configuration as for the potable phone 100 shown in FIGS. 18 to 22, it has a different configuration of the engaging means 120 from the portable phone 100. Therefore, the configuration of the engaging means 120 is described here, and the same reference numerals have been retained for the same parts as components in FIGS. 18 to 22 with their description omitted.

Figure 23:
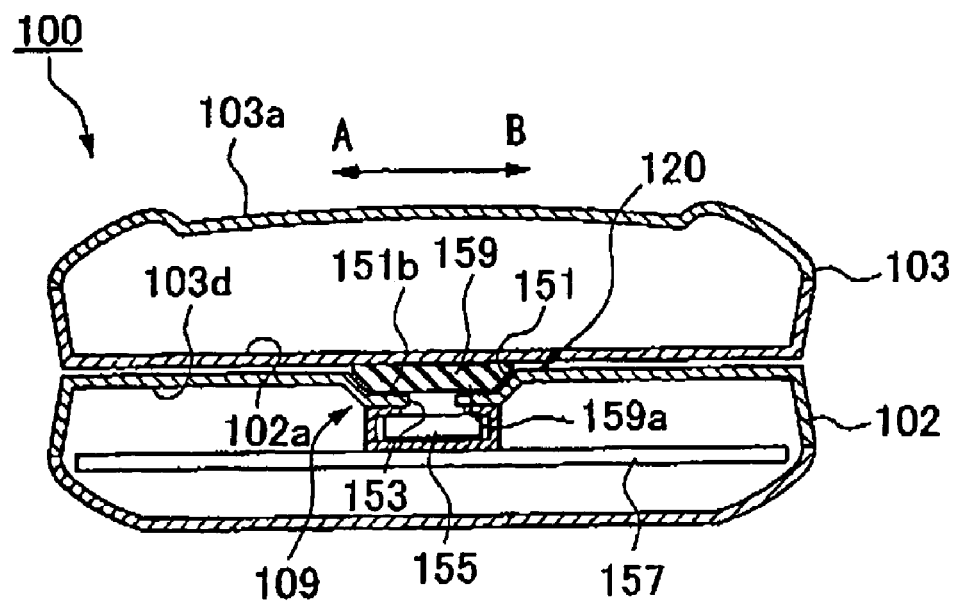
FIG. 23 is an enlarged cross section showing the engaging means of the portable phone according to a further preferred embodiment of the present invention.

As shown in FIG. 23, the engaging means 120 is configured by using a microphone unit 109 provided on the side of a front end of an opposed face 102a of a first casing 102. More specifically, the microphone unit 109 is provided in a depression 151 depressed inwardly from the opposed face 102a of the first casing 102, a through-hole 153 formed on a bottom wall surface 151b of the depression 151, and an inside of the first casing 102, having a microphone 155 fixed to the position opposed to the through-hole 153. The microphone 155 converts sounds incoming from outside via the through-hole 153 to electrical signals and it is fixed to a circuit board 157 arranged inside the first casing 102. The depression 151 has an inclined face gradually broadening toward the opposed face 102a of the first casing 102 from the bottom wall surface 151b of the depression.

A projection 159 inserted into the depression 151 of the microphone 109 is attached to an opposed face 103d of a second casing 103 in the condition where the two casings 102 and 103 are closed. The projection 159 is formed of an elastic body such as rubber similarly to the projection 115 of the preferred embodiment of FIG. 2 and its tip 159a is tapered. The depression 151 of the microphone unit 109 and the projection 159 that can be inserted into the depression 151 form engaging means 20.

As stated above, according to the portable phone 100, it has the same effects as in the preferred embodiments of FIGS. 2 and 12 and may close the through-hole 153 of the microphone unit 109 by using the projection 159. Therefore, it is possible to prevent dust, liquid, or other foreign matter from getting into the second casing 2 while carrying the portable phone 100 with the casings 102 and 103 closed, by which it is possible to prevent the microphone 155 from being damaged.

While the engaging means 120 is configured using the microphone unit 109 for the depression 151 in the preferred embodiment of FIG. 23, it can also be configured using, for example, a speaker unit. In this case, a speaker converting electrical signals to sounds may be disposed so as to be opposed to the through-hole of the depression, instead of the microphone 155. In addition, the engaging means 120 may be configured by using, for example, a light emitting unit for indicating information such as an incoming call, receiving an e-mail, or an alarm by means of the light emission. In this case, a light emitting element made of light emitting diodes may be disposed so as to be opposed to the through-hole of the depression, instead of the microphone 155.

With the arrangement of the engaging means 120 using the speaker unit or the light emitting unit, it is possible to prevent the speaker or the light emitting element from being damaged in the configuration where the casings 102 and 103 are closed similarly to the arrangement using the microphone unit 109.

Figure 24:
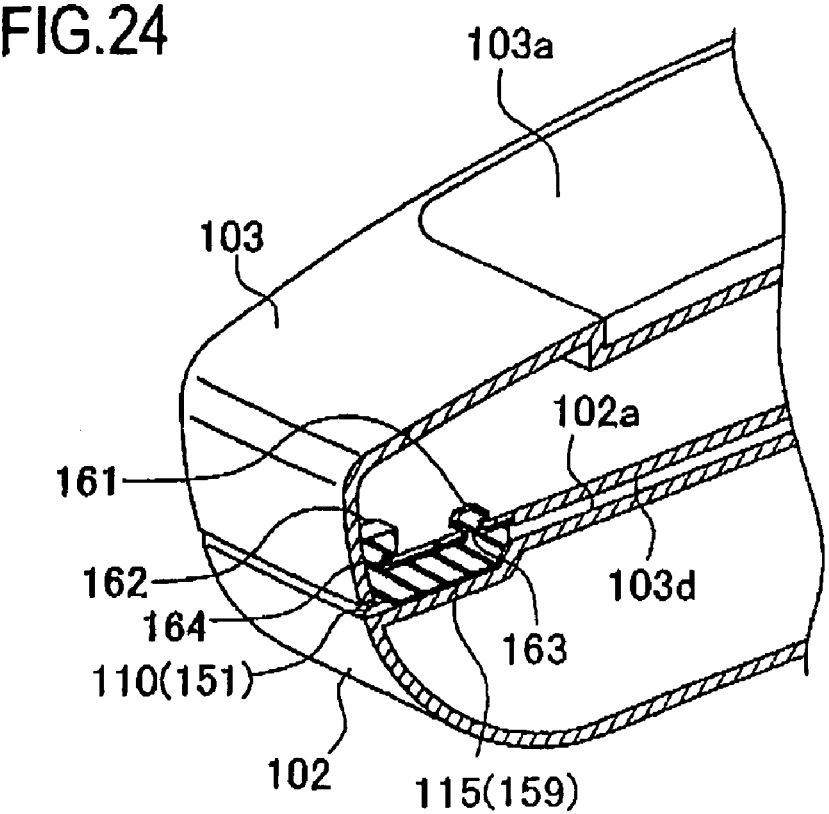
FIG. 24 is an enlarged cross sectional perspective view showing engaging means of a portable phone according to the preferred embodiment of FIG. 23.
Figure 25A:
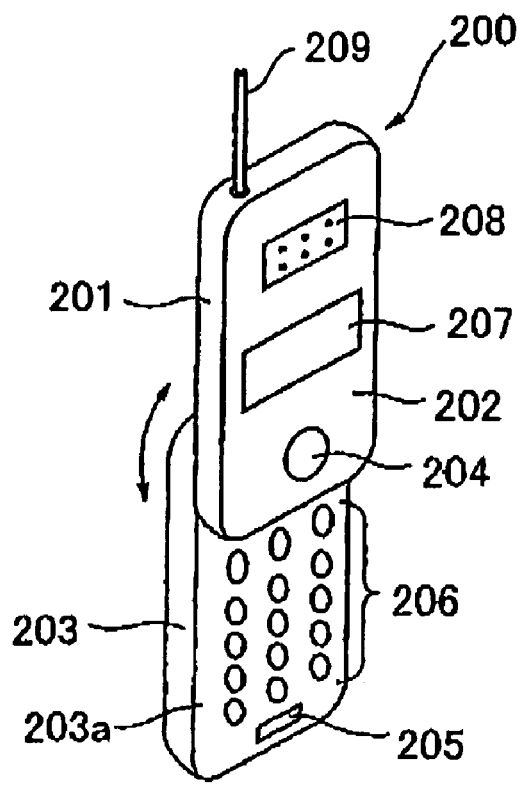
FIG. 25(A) is a plan view showing an opened configuration and FIG. 25(B) is a plan view showing a closed condition.
Figure 25B:
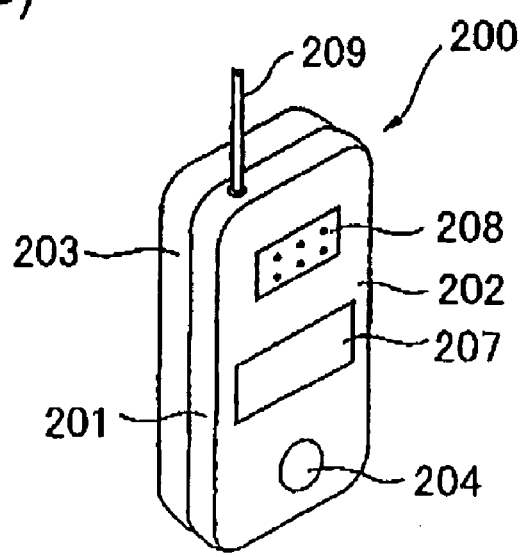

While the projections 115 and 159 are attached to the opposed face 103d of the second casing 103 in the above embodiment, it is not limited thereto, but any other arrangement is possible if the projections 115 and 159 do not easily come off the opposed face 103d. Therefore, for example, as shown in FIG. 24, hook-shaped engaging portions 161 and 162 may be formed on the side of the rear end of the projections 115 and 159 and the engaging portions 161 and 162 may be engaged with the through-holes 163 and 164 formed on the opposed face 103d of the second casing 103 for the projections 115 and 159 to be attached.

Furthermore, while the coupling means 105 is provided with the guide means 140, it need not be provided particularly. In this arrangement, when opening from the position in which the casings 102 and 103 are closed each other with the rotation, the biasing means 20 biases the front ends 102b and 103b of the casings 102 and 103 in the direction of bringing them close to each other, by which the projections 115 and 159 abut the opposed face 102a of the first casing 102. Since, however, each of the projections 115 and 159 is formed of an elastic body such as elastically deformable rubber, it is possible to prevent the opposed face 102a of the first casing 2 and the operation unit 107 provided on the opposed face 102a being damaged by contact.

Furthermore, the present invention is not limited to the configuration where the operation unit 107 is provided on the opposed face 102a of the first casing 102 and the display unit 111 is provided on the outer surface 103a of the second casing 103, For example, the display unit 111 may be provided on the opposed face 102a of the first casing 102 and the operation unit 107 may be provided on the outer surface 103a of the second casing 103. In this arrangement, since the two casings 102 and 103 do not relatively rotate unexpectedly when operating the operation unit 107 with the casings 102 and 103 closed, it is possible to achieve good operationality of the portable phone 100. In addition, when opening or closing the two casings with the relative rotation, the projections 115 and 159 do not damage the display unit 11.

In addition, The arrangement may be such that cords such as power lines or signal lines are inserted to pass through the joint 13, the rotator 12, the rotator 61, and the rotator 84 in the axial direction to rotate the first casing 1. Furthermore, since the first base member 81, the second base member 83, the rotator 84, and the like are formed of a conductive metal material in the preferred embodiment of FIG. 12, the rotating mechanism itself is considered to be a conductive portion and the second casing 2 (the main unit 2) and the first casing 1 (superposing unit 1) may be electrically connected. The same arrangement may be applied to other embodiments While the present invention has been described in connection with certain preferred embodiments, it is to be understood that the subject matter encompassed by the present invention is not limited to those specific embodiments. On the contrary, it is intended to include all improvements, alternatives, and modifications as can be included within the spirit and scope of the present invention. More specifically, while the present invention has been described by giving an example of a portable phone having two speakers in the preferred embodiments of the portable terminal of the present invention, naturally the portable phone can be provided with only a single speaker. Furthermore, as stated above, the portable terminal is applicable to various devices such as a PDA or a portable personal computer as well as the portable phone.

What is claimed is:

1. An opening or closing method for use in a portable communications terminal having a mechanism for coupling ends of a first casing and a second casing superposed on each other, and for opening or closing the portable terminal by rotating the first casing relative to the second casing with surfaces of the same side in the first casing and the second casing directed substantially in the same direction, wherein the first casing is relatively spaced away from the second casing at least in an initial stage of the rotation of the first casing and the two casings rotate around a first reference axis extending in the direction of thickness and one of said first and second casings is coupled to the other of said first and second casings so as to be pivotable around a second reference axis perpendicular to the first reference axis, and said casings are spaced apart by inclining one of said first and second casings relative to the other of said first and second casings around the second reference axis at least in an initial stage of the rotation of one of said first and second casings and the other of said first and second casings.

2. The opening or closing method according to claim 1, wherein an angle formed between the first casing and the second casing remains constant and then increases to reach a given angle when the first casing is rotated relative to the second casing by means of said mechanism after the initial stage of the rotation.

3. The opening or closing method according to claim 1, wherein an angle formed between the first casing and the second casing gradually increases to reach a given angle when the first casing is rotated relatively to the second casing by means of said mechanism after the initial stage of the rotation.

4. A portable communications terminal having a first casing and a second casing, wherein the casings have respective first and second surfaces facing a user of the portable terminal, the portable terminal comprising:
  a rotating mechanism coupling the first casing to the second casing and inclining the first casing relative to the second casing during at least an initial stage of rotating the first casing relative to the second casing,
  whereby the surfaces substantially face the user when rotating the first casing relative to the second casing and wherein the rotating mechanism has a first base member with a mounting hole fixed to the second casing and a second base member with a rotator fixed to the first casing and rotatably engaged with the mounting hole, wherein the second base member is pivotable around a pivot shaft perpendicular to an axis of the rotator by the pivot mechanism, wherein the first casing is provided with a protrusion and the second casing is provided with a guide abutted by the protrusion, and wherein the rotating mechanism has biasing means for biasing the protrusion to the guide.

5. The portable communications terminal according to claim 4, wherein the biasing means is an elastic body disposed with being elastically deformed between the second base member and the rotator so as to generate a biasing force for biasing the protrusion against the guide by means of a restoring force of the elastic body.

6. The portable communiciations terminal according to claim 4, wherein the second base member includes a locking plate fixed to the first casing and a cylindrical body integrally disposed at the locking plate, wherein the cylindrical body is pivotable relative to the rotating shaft perpendicular to the axis of the cylindrical body and penetratingly disposed, wherein the pivot mechanism is configured by coupling the second base member to the rotator with the rotating shaft fixed to the rotator so as to be perpendicular to the axis of the rotator; and wherein the biasing means is an elastic body disposed between the cylindrical body and the rotator so as to generate a biasing force for biasing the protrusion provided on the first casing against the guide provided on the second casing by means of a restoring force of the elastic body.

7. The portable communications terminal according to claim 4, wherein the second base member is a bracket having an uneven bearing fixed to the first casing, wherein the rotator has an uneven shaft protruding in a perpendicular direction to the axis of the rotator; wherein the uneven shaft passes through the uneven bearing to couple the bracket to the rotator so as to form the pivot mechanism, and wherein the biasing means is formed of an elastic body disposed between the bracket and the rotator so as to generate a biasing force for biasing the protrusion provided on the first casing against the guide provided on the second casing by means of a restoring force of the elastic body.

8. The portable communications terminal according to claim 4, wherein the second base member is a bracket having a through-hole fixed to the first casing, wherein a pair of uneven axial plates protruding toward the inside of the through-hole are oppositely disposed in the through-hole, wherein grooves engraved halfway in the axial direction of the rotator are oppositely disposed on a periphery of the rotator, wherein the pivot mechanism is formed by coupling the bracket to the rotator by passing the rotator through the through-hole of the bracket and supporting the uneven axial plate of the bracket to be engaged with the grooves of the rotator; and wherein the biasing means is formed of an elastic body disposed between the bracket and the rotator so as to generate a biasing force for biasing the protrusion provided on the first casing against the guide provided on the second casing by means of a restoring force of the elastic body.

9. The portable communications terminal according to claim 4, wherein the portable terminal has a depression into which the protrusion fits at a location of the guide opposed to the protrusion in the configuration where the first and second casings are superposed on each other.

10. The portable communications terminal according to claim 4, wherein the rotator is hollow and power or signal leads guided to the first casing and the second casing are passed through the hollow portion.

11. A portable communications terminal having a first casing and a second casing, wherein the casings have respective first and second surfaces facing a user of the portable terminal, the portable terminal comprising:

a coupling mechanism coupling the first casing to the second casing wherein the coupling mechanism enables the first and second casings to rotate around a first reference axis extending in a direction of thickness of the portable terminal and wherein the coupling mechanism couples the first casing to the second casing so as to be pivotable around a second reference axis perpendicular to the first reference axis;

and a pivot mechanism for spacing said casings apart by inclining one of said first and second casings relative to the other said first and second casings around the second reference axis at least in an initial stage of the rotation of one of said first and second casings and the other said first and second casings.

12. The portable communications terminal according to claim 11, wherein the coupling mechanism has positioning mechanisms at least in a position in which the first and second casings are superposed on each other and in a position in which one of the first and second casings is rotated substantially 180 degrees from the position.

13. The portable communications terminal according to claim 12, wherein the portable terminal has a microphone or a speaker in the first casing.

14. The portable communications terminal according to claim 11, wherein the coupling mechanism has biasing means for biasing the first casing towards the second surface of the second casing.

15. The portable communications terminal according to claim 11, wherein the coupling mechanism has angle control means for varying an angle formed between the first and second surfaces during the relative rotation of the first casing and the second casing.

16. The portable communications terminal according to claim 15, wherein the angle control means maintains a constant angle formed between the first and second surfaces and increases the angle after the initial stage of the rotation from a position in which the first and second casings are superposed on each other.

17. The portable communications terminal according to claim 15, wherein the angle control means gradually increases the angle formed between the first and second surfaces after the initial stage of the rotation from a position in which the first and second casings are superposed on each other.

18. The portable communications terminal according to claim 15, wherein the angle control means has a guide provided respectively on the first casing or the second casing and a protrusion provided respectively on the second casing or the first casing and abutting the guide, and varying the angle between the first and second surfaces by sliding the protrusion on the guide with the relative rotation of the first and second casings.

19. The portable communications terminal according to claim 18, wherein the portable terminal has a depression mated with the protrusion at a location of the guide opposed to the protrusion when the first and second casings are superposed on each other.

20. The portable communications terminal according to claim 11, wherein the first surface of the first casing facing the user includes a display unit and/or a speaker, and wherein the second surface of the second casing facing the user includes an operation unit and/or a microphone.

21. The portable communications terminal according to claim 11, wherein there is provided a depression on an opposed face of one of the two casings opposed to each other in the closed configuration where the two casings are superposed on each other, and there is provided a protrusion inserted to the depression on the opposed face of the other of the two casings.

22. The portable communications terminal according to claim 21, wherein the two casings have substantially rectangular opposed faces; wherein the coupling mechanism couples respective ends of the two casings to each other, wherein the protrusion and the depression are provided at the other ends of the two casings; and the coupling mechanism includes biasing means for biasing the other ends of the two casings against each other in a direction of bringing the other ends close to each other, and guide means for spacing the other ends of the two casings apart in the direction of thickness of the two casings against a biasing force of the biasing means in conjunction with an action of rotationally opening around the first reference axis from the closed configuration where the two casings are superposed on each other, and for bringing the other ends of the two casings close to each other in the direction of thickness in conjunction with an action of rotationally closing around the first reference axis from the opened configuration where the two casings are spaced apart.

23. The portable communications terminal according to claim 21, wherein a side wall of the depression in the direction of the relative rotation of the two casings is an inclined face gradually broaden toward the opposed face from a bottom wall surface of the depression.

24. The portable communications terminal according to claim 21, wherein the protrusion is an elastic body.

* * * * *